US007786927B2

(12) United States Patent
Kondoh

(10) Patent No.: US 7,786,927 B2
(45) Date of Patent: Aug. 31, 2010

(54) RADAR, RADIO FREQUENCY SENSOR, AND RADAR DETECTION METHOD

(75) Inventor: Hiroshi Kondoh, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/976,718

(22) Filed: Oct. 26, 2007

(65) Prior Publication Data

US 2008/0100500 A1    May 1, 2008

(30) Foreign Application Priority Data

Oct. 31, 2006   (JP)   ............... 2006-295453

(51) Int. Cl.
*G01S 13/34* (2006.01)
(52) U.S. Cl. .............. 342/109; 342/112; 342/128; 342/200
(58) Field of Classification Search ............. 342/109
See application file for complete search history.

(56) References Cited

U.S. PATENT DOCUMENTS

| | | | | |
|---|---|---|---|---|
| 4,881,079 A | * | 11/1989 | Peregrim | 342/194 |
| 5,268,692 A | * | 12/1993 | Grosch et al. | 342/70 |
| 5,298,962 A | * | 3/1994 | Nourrcier | 356/5.09 |
| 5,345,470 A | * | 9/1994 | Alexander | 375/144 |
| 5,349,358 A | * | 9/1994 | Canal | 342/128 |
| 5,963,163 A | | 10/1999 | Kemkemian et al. | |
| 6,396,436 B1 | * | 5/2002 | Lissel et al. | 342/70 |
| 6,469,656 B1 | * | 10/2002 | Wagner et al. | 342/70 |
| 6,492,938 B1 | * | 12/2002 | Alland | 342/129 |
| 6,587,074 B1 | * | 7/2003 | Winter et al. | 342/130 |
| 6,606,052 B1 | * | 8/2003 | Miyahara | 342/70 |
| 6,633,815 B1 | * | 10/2003 | Winter et al. | 701/301 |
| 6,703,969 B2 | * | 3/2004 | Winter et al. | 342/174 |
| 6,943,727 B2 | * | 9/2005 | Meinecke et al. | 342/192 |
| 6,977,609 B2 | * | 12/2005 | Pleva et al. | 342/28 |
| 7,002,512 B2 | * | 2/2006 | Isaji | 342/159 |
| 7,071,868 B2 | * | 7/2006 | Woodington et al. | 342/70 |
| 7,308,043 B1 | * | 12/2007 | Frank | 375/303 |
| 7,400,290 B2 | * | 7/2008 | Woodington et al. | 342/84 |
| 7,508,337 B2 | * | 3/2009 | Morinaga et al. | 342/109 |

(Continued)

OTHER PUBLICATIONS

"Automotive Radar Research and Development Report", Reference Literature 2, Jul. 1993, in Japanese with English translation pp. 1-21.

*Primary Examiner*—Thomas H Tarcza
*Assistant Examiner*—Matthew M Barker
(74) *Attorney, Agent, or Firm*—Stites & Harbison, PLLC; Juan Carlos A. Marquez, Esq

(57) ABSTRACT

In a sensor and a radar for measuring the distance and the moving speed of a target by radiating a radio frequency, particularly a millimeter wave, compatibility between cost reduction and high detection performance has been conventionally a significant problem. In the present invention, the frequency of a transmitted signal changes during a fixed time while performing digitally-frequency-modulation on frequency sweeping straight lines extending, with different slopes relative to the time axis, from plural slightly different initial values serving as starting points, the signal is transmitted after being modulated so as to periodically repeat the sweep time serving as a unit, signal components corresponding to the respective sweeping slopes are digitally sampled, in synchronization with the transmitted modulation signal, from a received signal which is reflected and returned from a target, and the received signal is analyzed.

14 Claims, 19 Drawing Sheets

U.S. PATENT DOCUMENTS

| | | | |
|---|---|---|---|
| 7,663,534 B2 * | 2/2010 | Hilsebecher et al. | 342/109 |
| 7,714,771 B2 * | 5/2010 | Lehre et al. | 342/109 |
| 2004/0138802 A1 * | 7/2004 | Kuragaki et al. | 701/70 |
| 2005/0046597 A1 * | 3/2005 | Hutchison et al. | 340/917 |
| 2006/0109169 A1 * | 5/2006 | Winter et al. | 342/70 |
| 2007/0152871 A1 * | 7/2007 | Puglia | 342/70 |
| 2008/0114510 A1 * | 5/2008 | Wilhelm et al. | 701/41 |
| 2009/0121915 A1 * | 5/2009 | Randler et al. | 342/70 |

* cited by examiner (V=0)

RADAR, RADIO FREQUENCY SENSOR, AND RADAR DETECTION METHOD

CLAIM OF PRIORITY

The present invention claims priority from Japanese application JP 2006-295453 filed on Oct. 31, 2006, the content of which is hereby incorporated by reference into this application.

FIELD OF THE INVENTION

The present invention relates to radars for measuring the distance and the moving speed of a target, sensors, and radar detection methods, and particularly relates to multi-ramp digitally-frequency-modulated radars with initial frequency offsets which are suitable for vehicle mounted radars.

BACKGROUND OF THE INVENTION

In order to satisfy performance required of vehicle mounted radars with low cost, various radar modulation schemes have been used. As examples of such radar modulation schemes, a frequency-modulated continuous wave (FMCW) technique, a two-frequency CW technique, and so on are disclosed in Reference 2, RCR TR-26, "Automotive Radar Research and Development Report" edited by Research & Development Center for Radio System, July 1993. The above FMCW and two-frequency CW are radar schemes for detecting the speeds and the distances and the distances of moving objects.

U.S. Pat. No. 5,963,163 discloses an advanced scheme of two-frequency CW.

SUMMARY OF THE INVENTION

In recent years, in the application of millimeter-wave automotive radars (hereinafter, will be referred to as vehicle mounted radars) which have widely received attention as examples of radio frequency sensors and have been put into practical use, a number of objects to be detected (targets) are disposed at relatively short distances, for example, at 0 m to 200 m.

Further, the millimeter wave automotive radars operate in environments where moving objects such as vehicles are present among an extremely large number of static objects. Thus high detection performance is demanded. Moreover, it is desired that radio frequency sensors serving as vehicle mounted radars be less expensive commercial products. Conventionally, compatibility between cost reduction and high detection performance has been a significant problem.

Various radar modulation schemes including frequency modulated continuous wave (FMCW) and two-frequency CW have been used to satisfy performance demanded of vehicle mounted radars with low cost.

Conventionally, a FMCW technique has been used for radio frequency sensors, particularly for vehicle mounted sensors. This technique demands wide-band frequency sweep and high sweep linearity of oscillators. Further, since upward frequency sweep and downward frequency sweep are carried out by time sharing, at least two sweep time periods are necessary for measurements. Moreover, since the bandwidth of a received signal is wide high-speed and high-capacity signal processing is necessary.

For example, in FMCW modulation described in "Automotive Radar Research and Development Report", as shown in FIG. 18, the frequency of a transmitted signal is linearly swept upward in a first period T and is swept downward in the subsequent period T. In this FMCW technique, an object or a target at a short distance cannot be theoretically detected. Moreover, pairing of the signal in the frequency upward sweep and the signal in the frequency downward sweep is necessary for calculating the distance and the relative speed of an object, which becomes complicated with the existence of a large number of static objects. Thus a load on a signal processing circuit increases and simultaneously erroneous detection and failed detection are prone to occur.

The two-frequency CW technique is known as a different signal modulation technique from FMCW. In this technique, only a narrow frequency modulation bandwidth of an oscillator and narrow band signal processing are needed, so that this technique is suitable for cost reduction. However, there is a problem that it is theoretically difficult to detect a target having a Doppler frequency of 0 and to separate multiple targets with the same speed. The two-frequency CW technique makes it possible to easily calculate a distance and a relative speed, can be achieved with simple radio frequency hardware, and requires only a narrow frequency bandwidth when obtaining similar performance. However, all static objects fall into signals of almost a single frequency corresponding to the travel speed of a vehicle (the speed of a carrier vehicle) having a radar, so that it is quite easy to separate a mobile object from the static objects but it is difficult to separate the large number of static objects from one another. Further, a mobile object having a relative speed of 0 with respect to the carrier vehicle cannot be theoretically detected (though practically a relative speed of 0 is quite rare).

The radar modulation scheme disclosed in U.S. Pat. No. 5,963,163 provides, as shown in FIG. 19, a method of removing uncertainty between a distance and a speed by modifying the dual-wave CW technique, as well as removing the drawbacks of the FMCW modulation technique. Signals are transmitted while two frequency straight lines are alternately switched. The frequency straight lines start from two different frequencies having a small difference ($\Delta f$) and sweep in parallel on the time axis while keeping the difference. Thus even when plural targets are present at the same time, the method provided by U.S. Pat. No. 5,963,163 can reduce uncertainty and ambiguity of a speed and a distance. However, in theory, there is still an area where a target is undetected on the distance-speed plane. U.S. Pat. No. 5,963,163 also discloses a method for eliminating the undetected area but this method requires a long measurement time.

As described above, regarding conventional radars and radio frequency sensors, particularly vehicle mounted sensors, high detection performance is demanded. For example, further improvements are demanded in removal of uncertainty in target identification, reduction of a measurement time, or high-speed detection, and further cost reduction is demanded.

A main subject to be solved of the present invention is to provide a radar, a radio-frequency sensor, and a radar detection method which can remove uncertainty in target identification, improve the accuracy of detection, and satisfy demands for cost reduction.

The following will describe a representative example of the present invention: a radar of the present invention includes a signal generation unit and a transmission unit, wherein the signal generation unit has a function of generating a frequency modulation pattern for periodically repeating, in a sweep time T, a state in which a frequency of a transmitted signal stays for a predetermined time $T_{s(1\ to\ n)}$ on a position corresponding to one of N ($N \geq 2$) frequency sweep straight lines extended from different initial values $f_{(1\ to\ n)}$ at time t=0 with different slopes $S_{(1\ to\ n)}$ relative to the time axis, and the transmitted signal modulated by the frequency modulation pattern with the sweep time T serving as a unit is transmitted from the transmission unit.

According to the present invention, it is possible to achieve a radar and a radio frequency sensor which can reduce uncertainty in target identification and improve the accuracy of detection.

DETAILED DESCRIPTION OF THE PREFERRED EMBODIMENTS

According to a representative example of the present invention, the frequency of a transmitted signal changes during a fixed time T while digitally-frequency-modulating frequency sweeping straight lines extending, with different slopes with respect to the time axis, from plural slightly different initial values serving as starting points, the signal is transmitted after being modulated so as to periodically repeat the sweep time T serving as a unit, signal components corresponding to the respective sweeping slopes are digitally sampled, in synchronization with the transmitted modulation signal, from a received signal which is reflected and returned from a target, and then the received signal is analyzed. Thus it is possible to remove uncertainty of plural targets only with measurements in the sweep time T and simultaneously achieve a higher detection resolution than distance and speed resolutions determined by the bandwidth of a respective frequency sweep.

The following will specifically describe embodiments of a vehicle mounted radar to which the present invention is applied, in accordance with the accompanying drawings. It is needless to say that the present invention is applicable not only to a vehicle mounted radar using a radio frequency but also to a typical radar, for example, an aircraft radar and the like. In other words, the wave medium of the present invention may include an electromagnetic wave belonging to a millimeter wave, an electromagnetic wave having a lower frequency, a sound wave, and light.

First Embodiment

Referring to FIGS. 1 to 8, a vehicle mounted radar will now be described according to a first embodiment of the present invention.

Figure 1:
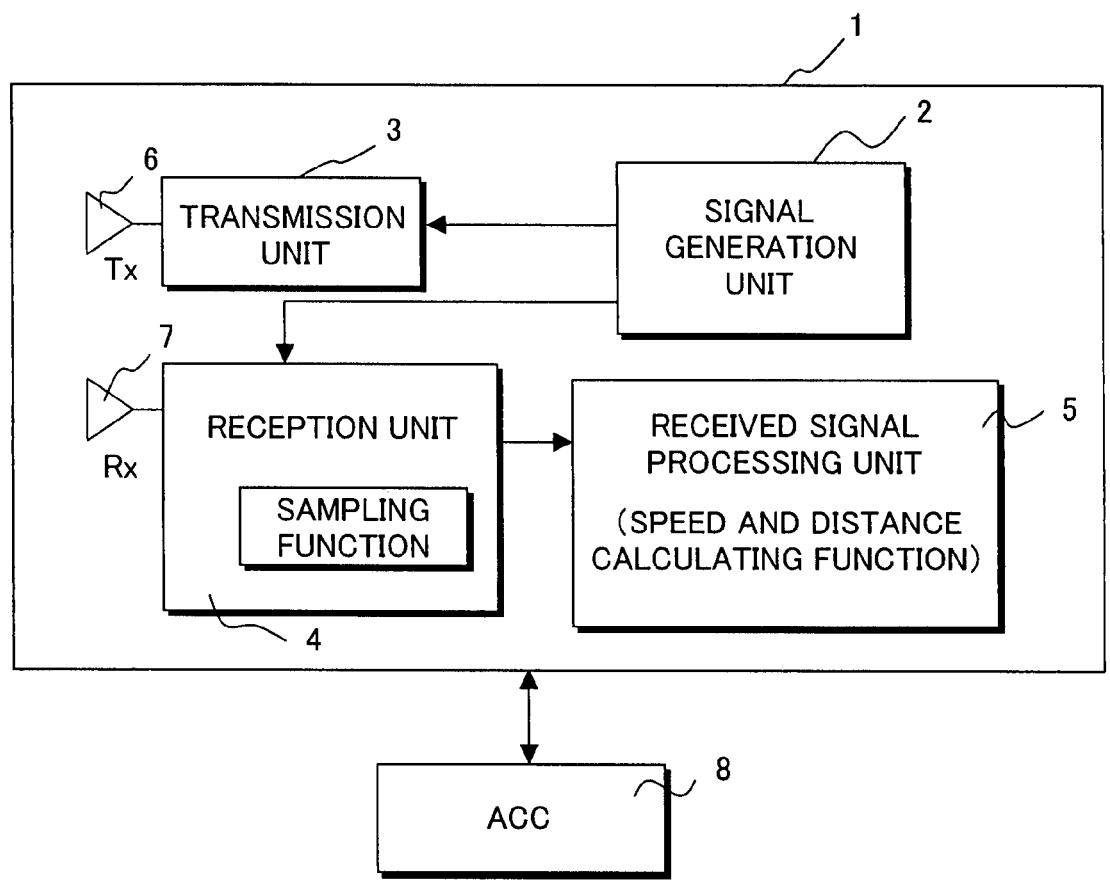
FIG. 1 is a block diagram for explaining the overall configuration of a vehicle mounted radar according to a first embodiment of the present invention.

FIG. 1 is a functional block diagram for explaining the overall configuration of the vehicle mounted radar according to the first embodiment of the present invention. A vehicle mounted radar 1 includes a signal generation unit 2, a transmission unit 3, a reception unit 4, a received signal processing unit 5, a transmission antenna 6, and a reception antenna 7. A transmitted millimeter-wave signal Tx generated through the signal generation unit 2 and the transmission unit 3 is transmitted from the transmission antenna 6, a signal Rx which is the transmitted signal having been scattered on a target to be detected is received by the reception unit 4 through the reception antenna 7, and the distance and speed of the target are detected by the received signal processing unit 5. Reference numeral 8 denotes a higher level system of a vehicle.

The signal generation unit 2 has the function of digitally-frequency-modulating "simultaneously-swept-multiple-frequency-ramps" which start from different initial frequencies, and periodically outputting any one of the multiple ramps. The transmission unit 3 generates the transmitted signal Tx having multiple ramp frequencies based on a signal and information from the signal generation unit 2, and transmits the signal from the transmission antenna 6.

In the presence of a relative speed between a vehicle having the radar 1 and a target, e.g., a preceding vehicle, the frequency of the received signal Rx includes a Doppler frequency. A phase difference between the transmitted signal and the received signal is detected by a radio frequency mixer and the like of the reception unit 4. The reception unit 4 also has a sampling function and extracts, from a received signal scattered and returned from the target, signal components corresponding to the respective frequency ramps by digital sampling in synchronization with a transmitted modulation signal.

The received signal processing unit 5 has a speed/distance calculating function of converting the extracted signal components to digital signal information, performing digital signal processing based on a predetermined function expression and so on, and determining a relative speed between the radar 1 and the target and a distance to the target. The relative speed and distance detected in the radar 1 are outputted to the higher-level system 8 of the vehicle and are used for travel control and so on of the vehicle.

Figure 2:
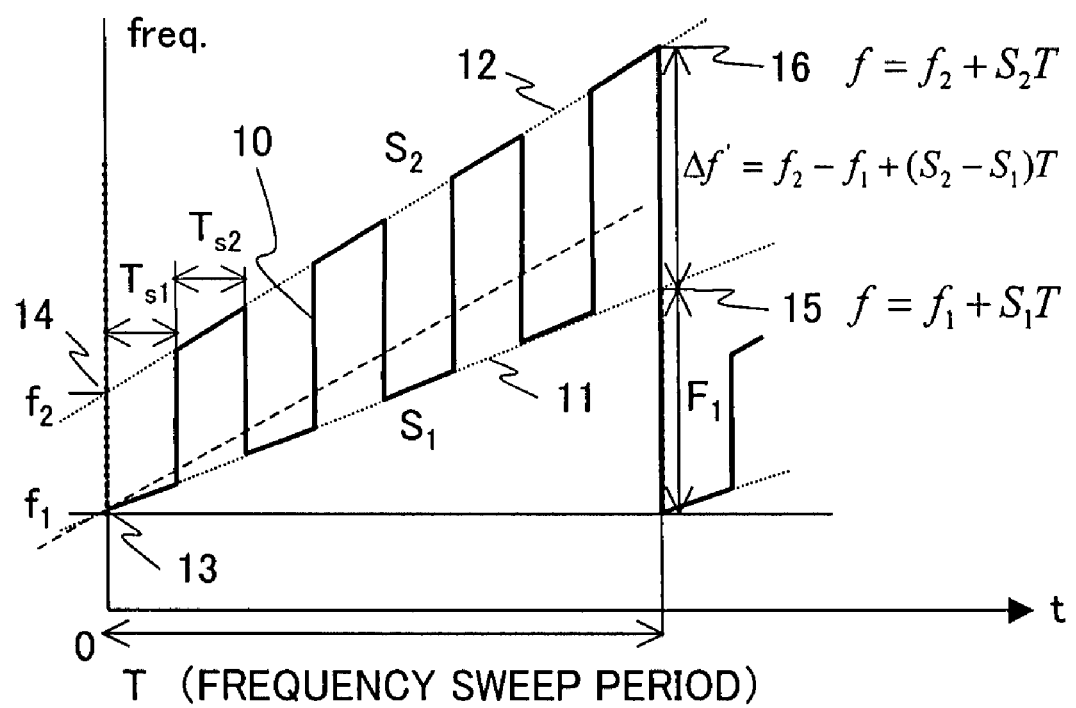
FIG. 2 shows a frequency modulation waveform of a transmitted signal of a radio frequency sensor according to the first embodiment of the present invention.

FIG. 2 shows a first example of the frequency modulation pattern of the transmitted signal which is generated by the signal generation unit 2, that is, the frequency of the transmitted signal of a radio frequency sensor relative to a time after the signal is frequency-modulated.

According to this frequency modulation pattern, a transmitted signal 10 starts at time t=0 from two initial values 13 (=$f_1$) and 14 (=$f_2$) which are different from each other by $\Delta f$ (=$f_2 - f_1$). The transmitted signal 10 is alternately placed on a first frequency sweep straight line (first ramp) 11 extended from the first initial value $f_1$ with a slope $S_1$ relative to the time axis and a second frequency sweep straight line (second ramp) 12 extended from the second initial value $f_2$ with a second slope $S_2$, which is different from the slope $S_1$, relative to the time axis. In other words, the transmitted signal alternately stays on the first frequency sweep straight line 11 for a first time $T_{s1}$ and the second frequency sweep straight line 12 for a second time $T_{s2}$. In this way, the frequency of the transmitted signal changes for a fixed time T (until time t=T) while the frequency is periodically and digitally switched along the two frequency sweep straight lines. The signal is modulated to periodically repeating the frequency modulation pattern in the sweep time T serving as a period.

Therefore, at the end of the sweep period T (time t=T), the first frequency sweep straight line 11 reaches a frequency 15 (=$f_1+S_1T$) and the second frequency sweep straight line 12 reaches a frequency 16 (=$f_2+S_2T$). In other words, the first frequency sweep straight line 11 and the second frequency sweep straight line 12 of the transmitted signal 10 have a frequency difference represented as $\Delta S \cdot T = (S_2-S_1)T$ in the sweep period T. In the following discussion, $S_2 > S_1$ and $\Delta f > 0$ are set for the sake of convenience.

The following will discuss the sampling function of the reception unit 4 and the speed/distance calculating function of the received signal processing unit 5.

First, when the transmitted signal Tx to be swept according to the first frequency sweep straight line 11 is expressed by equation (1), $\phi_{Tx(t)}$ in equation (1) is given by equation (1-2):

$$\exp[j\phi_{Tx}(t)] \quad (1)$$

$$\phi_{Tx}(t)/2\pi = f_1 t + \frac{S_1}{2}t^2 \quad (1\text{-}2)$$

When the transmitted signal is radiated from the radar, is reflected and scattered by a target traveling at a distance R with a relative speed v with respect to the radar, and returns to the radar, the signal Rx received by the radar has a phase expressed by equation (2) in which the amplitude is ignored:

$$\phi_{Rx}(t)/2\pi = f_1\left(t - \tau - \frac{2v}{c}t\right) + \frac{S_1}{2}\left(t - \tau - \frac{2v}{c}t\right)^2 \quad (2)$$

where $\tau=2R/c$ is given and c represents the speed of light.

When a phase difference between the transmitted signal and the received signal expressed by equations (1) and (2) is detected by, e.g., a radio frequency mixer in the reception unit 4, the output signal of the radio frequency mixer has a phase $\theta(t)$ expressed by equation (3):

$$\theta_1(t)/2\pi = \left(-\frac{2v}{c}f_1 - S_1\tau\right)\cdot t + S_1\tau\frac{2v}{c}t - S_1\frac{2v}{c}\left(1-\frac{v}{c}\right)\cdot t^2 - f_1\tau + \frac{S_1}{2}\tau^2 \quad (3)$$

Equation (3) can be approximated like equation (5) when satisfying the following conditional expression (4):

$$2v/c << 1 \text{ and } 2S_1T << f_1 \quad (4)$$

$$\theta_1(t)/2\pi = \left(-\frac{2v}{c}f_1 - S_1\tau\right)\cdot t - f_1\tau + \frac{S_1}{2}\tau^2 \quad (5)$$

$$= (f_{d1} - S_1\tau)\cdot t - f_1\tau + \frac{S_1}{2}\tau^2$$

$$\text{where } f_{d1} = -\frac{2v}{c}f_1$$

Similarly, relative to the transmitted signal which is swept according to the frequency sweep straight line 12, an output signal has a phase $\theta_2(t)$ expressed by equation (6) in which subscripts 1 of equations (1) to (5) are replaced with 2:

On conditions that $2v/c<<1$ and $2S_2T<<f_2$ are satisfied, $$\theta_2(t)/2\pi = \left(-\frac{2v}{c}f_2 - S_2\tau\right)\cdot t - f_2\tau + \frac{S_2}{2}\tau^2 \quad (6)$$

$$= (f_{d2} - S_2\tau)\cdot t - f_2\tau + \frac{S_2}{2}\tau^2$$

$$\text{where } f_{d2} = -\frac{2v}{c}f_2$$

Therefore, the time variations of the phases (equations (5) and (6)) of the output signal are obtained for the respective sweep slopes $S_1$ and $S_2$ and are expressed by equation (7), that is, frequencies $f''_{d1}$ and $f''_{d2}$ are expressed by equation (7). A phase difference $\Delta\theta$ not varying with time is expressed by equation (8):

$$f'_{d1} = f_{d1} - S_1\tau \quad (7)$$
$$f'_{d2} = f_{d2} - S_2\tau$$

$$\Delta\theta = -2\pi\tau\left[\Delta f - \frac{S_2 - S_1}{2}\tau\right] = -2\pi\tau\left[\Delta f - \frac{\Delta S}{2}\tau\right] \quad (8)$$

$$\text{where } \Delta f = f_2 - f_1 \text{ and } \Delta S = S_2 - S_1$$

Equations (7) and (8) are three independent equations for determining two unknowns (v,R) or (v,$\tau$) of the target and have a degree of redundancy.

When $\Delta f << f_1$ and $\Delta f << f_2$ are given in equation (7), equation (7) can be approximated as follows:

$$f'_{d1} = f_d - S_1\tau \quad (9)$$
$$f'_{d2} = f_d - S_2\tau$$
$$\text{where } f_d = -\frac{2v}{c}f_0$$

where $f_0=(f_1+f_2)/2$ is given.

Equation (8) can be approximated like equation (10) when satisfying $\Delta f/\Delta S \ll 1$, and X can be directly determined from observed $\Delta\theta$.

$$\tau = \frac{|\Delta\theta|}{2\pi \cdot \Delta f} \cdot \left[1 + \frac{\Delta S}{2\pi(\Delta f)^2}|\Delta\theta|\right] \quad (10)$$

Conditions of $\Delta f \ll f_0$, $2S_1T \ll f_0$, and $2S_2T \ll f_0$ for establishing equations (5), (6) and (9) mean that a frequency modulation width is sufficiently smaller than an RF center frequency $f_0$ on a proposed frequency modulation waveform.

Figure 3:
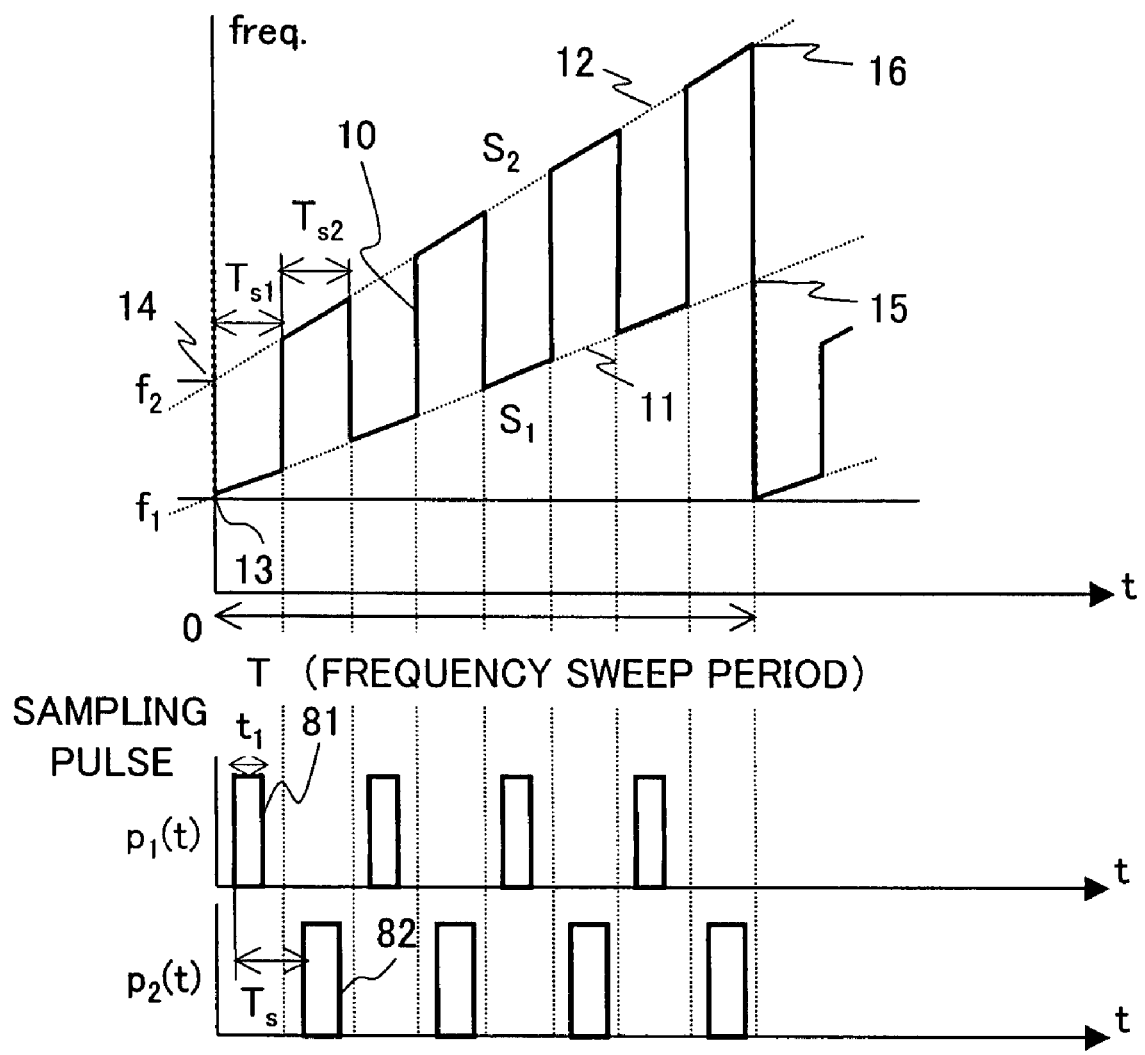
FIG. 3 is a timing diagram showing the sampling pulse of the received signal with respect to the frequency modulation waveform according to the first embodiment of the present invention.

In the above analysis, it is implicitly hypothesized that a signal (signal 11) corresponding to the frequency sweep straight line 11 along the slope $S_1$ and a signal (signal 12) corresponding to the frequency sweep straight line 12 along the slope $S_2$ are present at the same time and the phases of the signals at the same time are compared with each other. In an actual radar operation, as shown in FIG. 2, the signals 11 and 12 are alternately transmitted and radiated. Also regarding the values of the signals, as shown in FIG. 3, the received signal corresponding to the slope $S_1$ is sampled by a sampling signal $p_1(t)$ synchronized with the transmitted signal, and the received signal corresponding to the slope $S_2$ is sampled by a sampling signal $p_2(t)$ delayed from $p_1(t)$ by $T_s$. Therefore, in the digital signal processing and analysis of the received signal, the received signal has the maximum detectable frequency expressed by equations (5) and (6) and the maximum detectable frequency is $2/(T_{s1}+T_{s2})$ according to a sampling theorem. The minimum detectable frequency or the frequency resolution of the received signal is $2/T$, that is, $\Delta f_{min}$.

In discretization by sampling with equations (5) and (6), when a timing shift $T_s$ of this sampling is not taken into consideration, it is necessary to correct equations (7) and (8). Equations (7) and (8) are corrected by replacing t with $(t+T_s)$ when replacing subscripts of 1 with 2 in equations (1) to (3). As a result, equations (11) and (12) are obtained instead of equations (7) and (8):

$$f'_{d1} = f_{d1} - S_1\tau \quad (11)$$
$$f'_{d2} = f_{d2} - S_2\tau$$

$$\Delta\theta = -2\pi\tau\left[(\Delta f + S_2 T_s) - \frac{S_2 - S_1}{2}\tau\right] = -2\pi\tau\left[(\Delta f + S_2 T_s) - \frac{\Delta S}{2}\tau\right] \quad (12)$$
$$\text{where } \Delta f = f_2 - f_1 \text{ and } \Delta S = S_2 - S_1$$

Equation (12) indicates that it is desirable to use, instead of a frequency difference $\Delta f$ extrapolated to t=0, a difference $(\Delta f+S_2T_s)$ between an actual frequency at the transmission of the signal 11 and an actual frequency at the transmission of the signal 12.

In practical modulation settings, $\Delta f \gg S_2T_s$ is frequently given. In this case, equations (7) and (8) may be used in an approximate manner.

Generally, in vehicle mounted radars, the transmitted signal of a radio frequency sensor is an electromagnetic wave belonging to a millimeter wave. A wave medium may be an electromagnetic wave having a lower frequency, a sound wave, or light. Equations (1) to (12) are established as they are.

Figure 4:
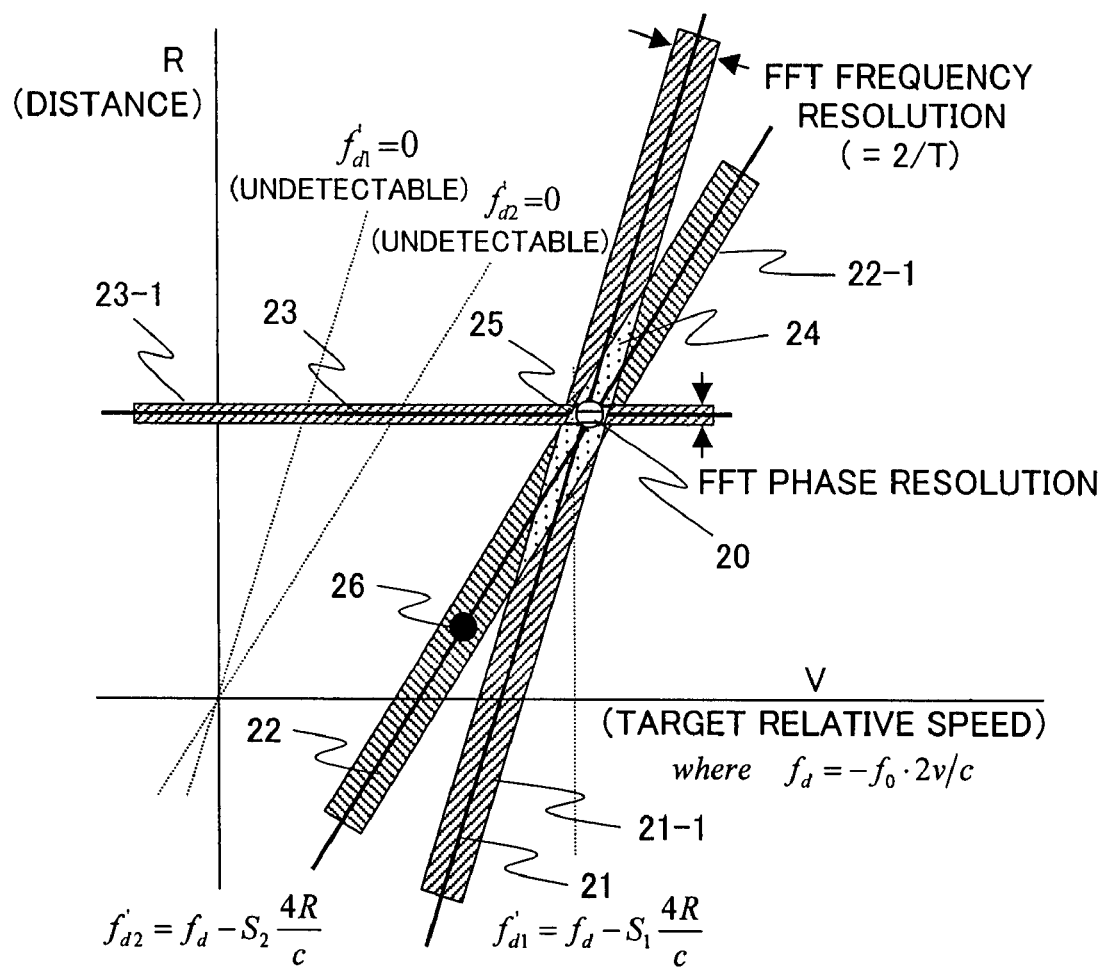
FIG. 4 shows a received signal on the (speed-distance) plane with respect to the frequency modulation waveform according to the first embodiment of the present invention.
Figure 5:
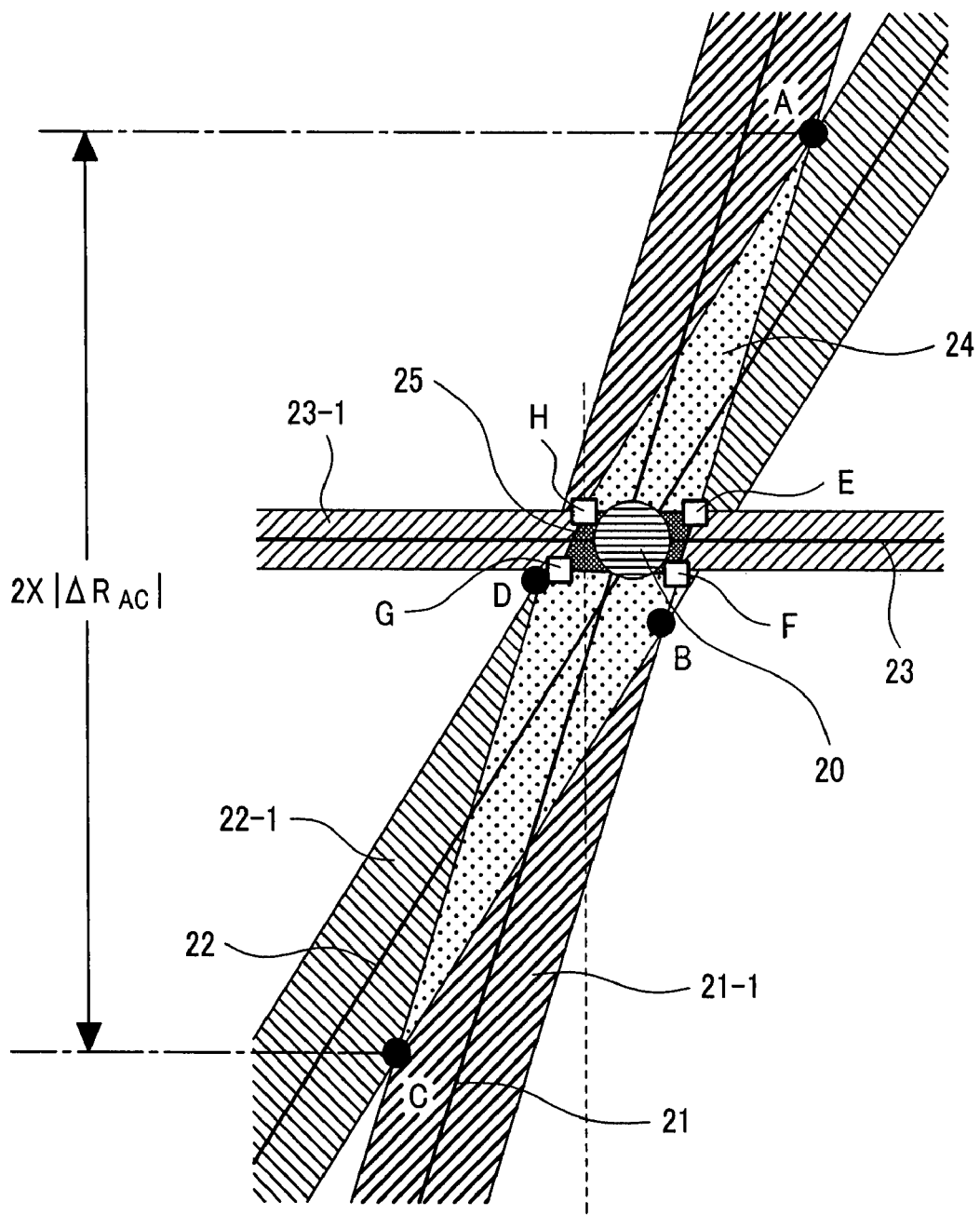
FIG. 5 is a partially enlarged view of FIG. 4.

Referring to FIGS. 4 and 5, the speed/distance calculating function of the received signal processing unit 5 will be described below. FIG. 4 shows the relationship between equations (11) and (12) and the relationship between equations (7) and (8) on the (v,R) plane. FIG. 5 is a partially enlarged view of FIG. 4.

Relative to a target 20 to be detected, a straight line 21 corresponds to a first frequency straight line $f'_{d1}$ of frequency equation (11) or equation (7) and a straight line 22 corresponds to a second frequency straight line $f'_{d2}$ of frequency equation (11) or equation (7). Reference numeral 26 denotes another target not to be detected.

The widths of belt-like zones 21-1 and 22-2 along the straight lines 21 and 22 indicate uncertainty zones corresponding to a theoretical frequency resolution 2/T obtained by digital sampling signal processing, that is, $\Delta f_{min}$. In an actual radar, the width of an uncertainty zone is $(\alpha \cdot \Delta_{min})$ depending upon the phase noise of a transmitted signal and the noise figure of a receiver. $\alpha$ is generally larger than 1. In the case of $\alpha=1$, the straight line 21 and the straight line 22 have respectively uncertainty of $c/[2S_1T]$ and $c/[2S_2T]$ in the distance direction.

The speed v and the distance R of the target 20 to be detected are determined as an intersection of the straight line 21 and the straight line 22. Due to the uncertainty, the uncertainty zone of a solution for (v,R) is given as a zone 24 shaped like a diamond surrounded by black dots A, B, C and D of FIG. 5.

Figure 20:
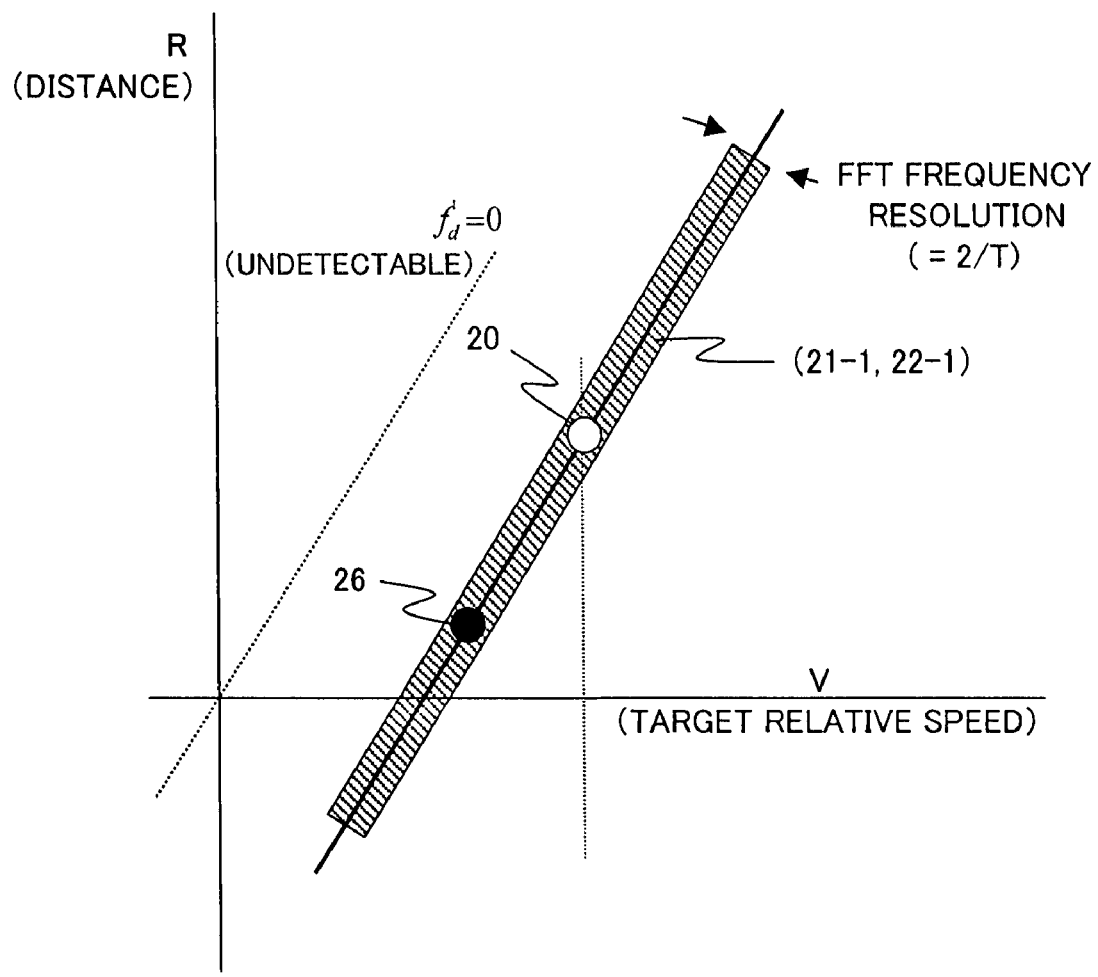
FIG. 20 is an explanatory drawing showing a challenge of the prior art.

When a conventional modulation waveform is used in which two frequencies having different slopes are not swept like the present invention, as shown in FIG. 20, an uncertainty zone is shaped like a belt having an infinite length, so that the belt-like zones 21-1 and 22-1 completely agree with each other. Thus the targets 20 and 26 in the uncertainty zone cannot be distinguished from each other.

On the other hand, according to the present invention, the uncertainty zone has a finite length and a width of 0 to $(\alpha \cdot \Delta f_{min})$. It is thus possible to determine (v,R) with higher accuracy as compared with the uncertain width of the straight line 21 or 22.

In other words, a line segment connecting a point A and a point C of the uncertainty zone 24 is disposed on a straight line expressed by equation (13), and a center $\tau_0$ of the line segment and a distance $\Delta\tau_{ac}$ on the R-axis (equivalently on the $\tau$-axis) from the center to the point A or C are expressed by equation (14).

$$f_d = -\frac{2v}{c}f_0 = \frac{S_2 + S_1}{2}\tau + \frac{f'_{d1} + f'_{d2}}{2} \quad (13)$$

$$\text{with } \tau_0 = \frac{f'_{d1} - f'_{d2}}{S_2 - S_1} \text{ and } \Delta\tau_{AC} = \pm\frac{\alpha \cdot \Delta f_{min}}{S_2 - S_1} \quad (14)$$

The length of the line segment of equation (14) can be rewritten to an expression about a distance in equation (15).

$$\Delta R_{AC} = \pm \frac{\alpha \cdot c}{\Delta S \cdot T} \quad (15)$$

Figure 6:
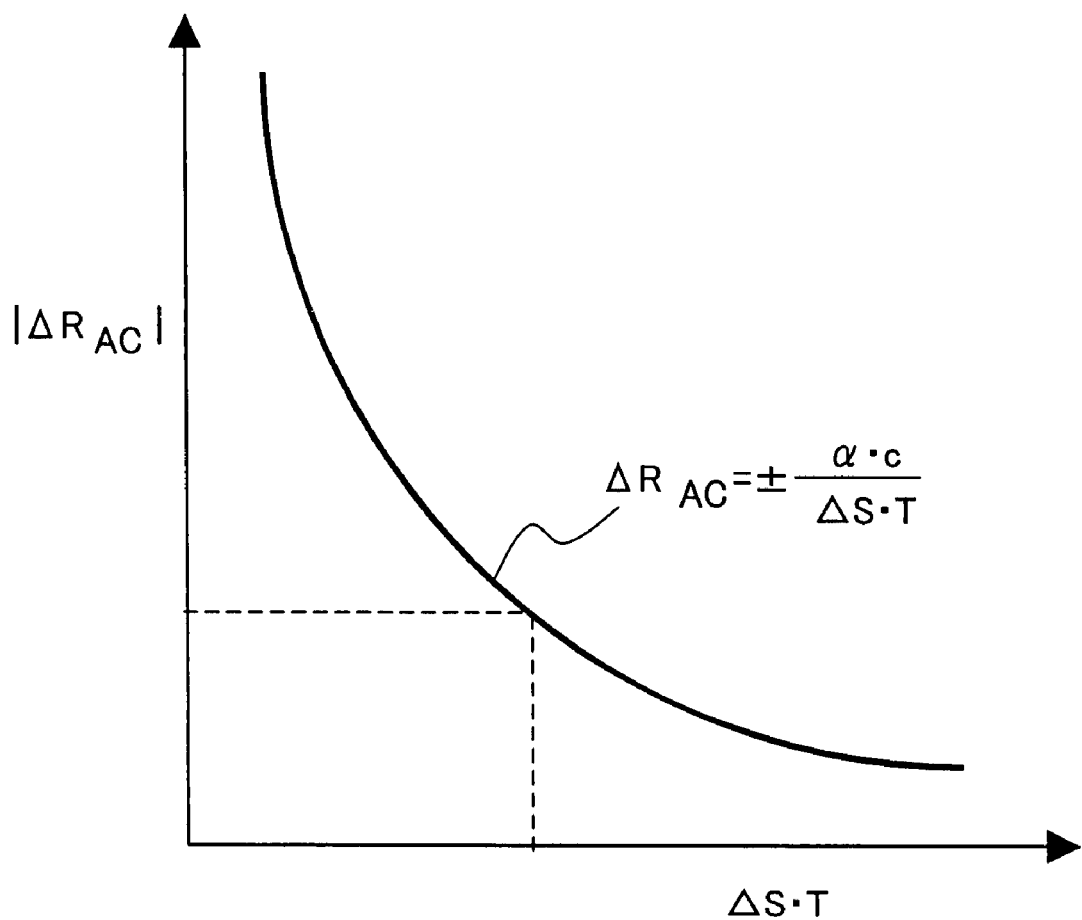
FIG. 6 is a drawing illustrating equation (15)

FIG. 6 illustrates equation (15). In FIG. 6, the horizontal axis represents $\Delta S \cdot T$ and the vertical axis presents the absolute value of a length $\Delta R_{AC}$ of distance uncertainty. As is evident from FIG. 6, the length $\Delta R_{AC}$ of distance uncertainty can be adjusted by setting $\Delta S \cdot T$. For example, when it is hypothesized that the length (equation 15) of distance uncertainty determined only by frequency equation (11) is 20 m, which is one tenth as long as the maximum detectable distance, at the maximum detection distance 200 m to be obtained in the vehicle mounted radar, the following relationship is obtained:

$$\Delta S \cdot T = \alpha c / \Delta R_{AC} = 30 \times 10^6 / 10 \text{ (sec)} = 30 \text{ MHz}$$

where $\alpha = 1$ and $\Delta R_{AC} = 10$ m are given.

As described above, the length $\Delta R_{AC}$ of distance uncertainty can be adjusted by properly setting the sweep slopes $S_1$ and $S_2$ according to characteristics desired for the vehicle mounted radar. The values of the sweep slopes $S_1$ and $S_2$ are determined by a difference in distance (degree of distance separation) between two different targets to be separately detected. The degree of distance separation is equal to the width of the belt-like zone 21-1 or 22-1 in the distance direction R of FIG. 4. For example, when the degree of distance separation is set at 2 m, the value of the sweep slope $S_1$ or $S_2$ is determined by $S \cdot T = c/2$ m=150 MHz.

When the modulation waveform of the present invention is used, as shown in FIG. 4, the two frequencies $f_{d1}$ and $f_{d2}$ of equation (11) simultaneously become 0 only when v=R=0 is established. Therefore, a zone where the target 20 to be detected becomes completely undetectable and is lost is substantially eliminated in the (v,R) plane, thereby remarkably reducing the possibility of undetected targets.

On the other hand, as described above, in the radar modulation scheme disclosed in U.S. Pat. No. 5,963,163 in which two parallel frequency sweep straight lines are used, the occurrence of a distance uncertainty zone having an infinite length cannot be eliminated because of a single frequency.

According to the present embodiment, the uncertainty zone can be reduced by equation (11) alone. The uncertainty zone can be further reduced by combining equation (11) with equation (12) relating to a phase. In other words, a straight line 23 parallel to the v-axis in FIG. 4 is a phase line corresponding to equation 12 relating to a phase, and the straight line 23 provides a redundant equation for the intersection point of frequency equation (11) and the uncertainty zone 24. The width of a belt-like zone 23-1 along the straight line 23 indicates an uncertain width of a phase calculation performed in digital sampling signal processing and depends upon the phase noise of a transmitted signal, the sensitivity of a receiver, a noise figure, and so on.

(v,R) of the target 20 is determined as an intersection zone of the straight line 23 or the zone 23-1 and the uncertainty zone 24 from the frequency equations, so that the resultant uncertainty zone is a zone 25 surrounded by four blank squares E, F, G and H in FIG. 5. The zone 25 is smaller than zones obtained by any combination of two expressions of equations (11) and (12). In other words, a combination of three expressions of equations (11) and (12) makes it possible to more accurately determine (v,R) for the target 20.

In a two-frequency CW technique where two frequency equations (equation (11)) cannot be obtained or in the modulation technique described in U.S. Pat. No. 5,963,163, it is necessary to remove ambiguity having a period of a phase measurement value of $2\pi$ so that the frequency variation $\Delta f$ satisfies equation (16):

$$\Delta f < c/(4 R_{max}) \quad (16)$$

where $R_{max}$ represents the maximum distance of a target to be detected.

On the other hand, in the frequency modulation technique of the present invention, the two frequency equations make it possible to identify the distance of a target in the range of the uncertainty zone 24. Thus even when multiple phase lines 23 of equation (12) are generated by the ambiguity of phase measurement values under the condition of equation (17), only one phase lines 23 intersecting the uncertainty zone 24 can be judged as being a correct phase line 23.

$$\Delta f > c/(4 R_{max}) \quad (17)$$

As is evident from equation (12), an increased $\Delta f$ can improve sensitivity to a distance and equivalently reduce the uncertain width of the belt-like zone 23-1 along the phase line 23, thereby improving distance accuracy.

As a result, the uncertainty zone 25 of (v,R) in FIG. 5 is further reduced, improving the accuracy of detection.

When achieving distance accuracy of 1 m only by two frequency equations as in, for example, FMCW modulation without using the frequency modulation waveform of the present invention, it is necessary to have a frequency sweep bandwidth of about 150 MHz. According to the present invention, the same accuracy can be obtained even with a considerably smaller frequency sweep bandwidth by using the third straight line 23 relating to a phase.

Further, the conventional FMCW modulation technique requires two sweep periods (=2T) to obtain two frequency equations, whereas in the present embodiment, two frequency equations can be obtained in the single sweep period T, so that a target can be detected at higher speed.

When plural targets are simultaneously present in the actual operating environment of the vehicle mounted radar and one of the targets comes onto, like the other target 26 of FIG. 4, a frequency line 22 where the target 20 to be detected has been present, the phase constant term of equation (6) may be largely deviated from the original value of the target 20 due to signal interference from both of the targets. The deviation caused by the interference increases particularly when the target 26 is larger than the target 20 and is close to the target 20.

Even under these circumstances, equation (11) is not affected and thus the zone 24 is not displaced. However, the phase line 23 may be largely displaced and the intersection zone with the zone 24 may disappear. In this way, signal interference can be detected using the degree of redundancy of equations (11) and (12) for determining (v,R) of the target 20, so that faulty data points can be removed.

Generally, when plural targets M are present, M frequency lines 21 and M frequency lines 22 are generated according to the respective targets and an erroneous combination of the frequency line 21 and the frequency line 22 causes erroneous detection of a target that is not supposed to be present.

Figure 7:
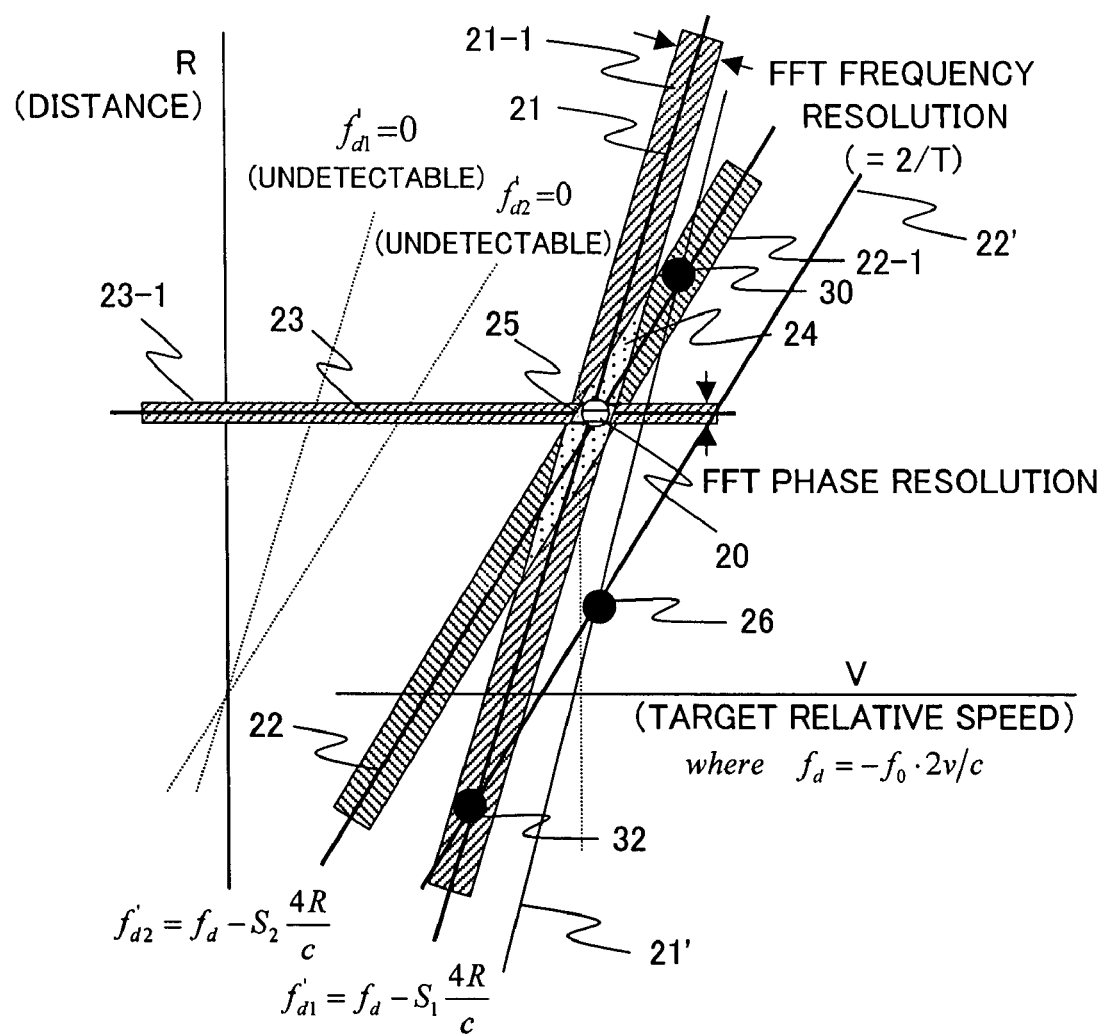
FIG. 7 is an explanatory drawing showing the effect of the first embodiment of the present invention.

For example, as shown in FIG. 7, when the two targets 20 and 26 are present, two frequency lines 21 and 21' and two frequency lines 22 and 22' are generated and a target 30 or 32 that is not supposed to be present may be erroneously detected. According to the present invention, the absence of the intersection zone of equations (11) and (12) is detected using the redundancy of the equation as in the case of the interference, in other words, the intersection zone of the frequency lines and the phase line 23 is detected, thereby reducing or eliminating the possibility of erroneous detection of the targets 30 and 32 that are not supposed to be present.

The effect of distance accuracy increased by the present invention will be described from another point of view.

Figure 8:
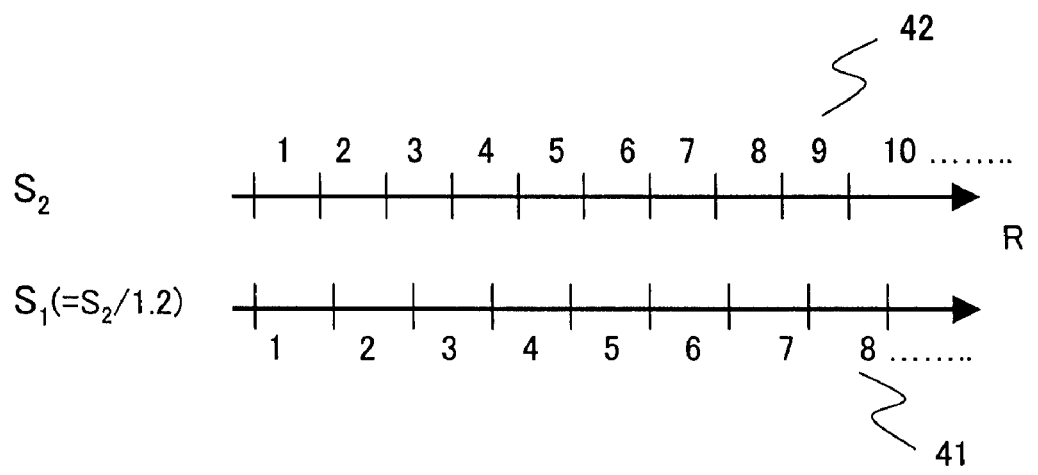
FIG. 8 is an explanatory drawing showing improvement in the accuracy of distance detection according to the first embodiment of the present invention.
Figure 8:
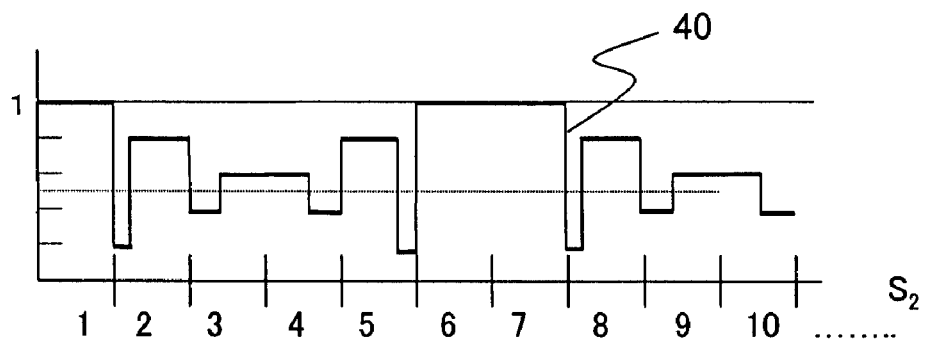

FIG. 8 illustrates, from another point of view, the uncertainty zone 24 shaped like a diamond in FIGS. 4 and 5 and illustrates the accuracy of detection increased by the uncertainty zone 24 while focusing on distance accuracy. When the true values of the speed and distance of the target 20 to be detected are (v,R), the values $f_{d1}$ and $f_{d2}$ of frequency equation (7), (9) or (11) which are outputted as a result of digital sampling of FIG. 3 are not consecutive values but discrete numeric values including the true values of $f_{d1}$ and $f_{d2}$ in a section (frequency bin) divided for each resolution $\Delta f_{min}$. The discrete numeric values have an output value at the central value of the frequency bin. The lengths of the bins of $f_{d1}$ and $f_{d2}$ in the distance direction R, that is, the distance resolutions are $c/[2S_1 T]$ and $c/[2S_2 T]$ that are equivalent to rulers having different scales.

For the sake of simplicity, FIG. 8 shows the case where the speed v=0. In FIG. 8, the case of $S_2/S_1=1.2$ is shown as an example. As an example of accuracy increased by rulers having different scales, when the true value of R is located in the third bin of the $S_2$ bin 42 for $f_{d2}$ and the true value is outputted to the second bin of the $S_1$ bin 41 for $f_{d1}$, it can be decided that the true value of R is located in the first 40% of the third bin of $S_2$. In other words, due to the Vernier effect using rulers having different scales, a distance can be detected with accuracy having a distance resolution improved to 40% of a $S_2$ resolution. When the $S_1$ bin for $f_{d1}$ is outputted to the third bin, the distance accuracy is 60% of the $S_2$ resolution. A line 40 of FIG. 8 indicates the calculation results of the distance resolutions for other frequency bins. It is understood that the distance resolution can be improved by the Vernier effect in almost all the cases.

The Vernier effect is obtained when the boundary of the $S_1$ bin having a lower resolution is present in the $S_2$ bin having a higher distance resolution, and the boundary corresponds to the uncertainty zone 24 shaped like a diamond in FIG. 5. Conditions for obtaining the Vernier effect for distance detection are expressed by equation (18):

$$0 < 1 + N_1 - m_v - \frac{S_1}{S_2} m_R - \left(1 - \frac{S_1}{S_2}\right) \frac{2\Delta v}{c \cdot \Delta f_{min}} f_0 < \frac{S_1}{S_2} \quad (18)$$

$$\text{where } m_v = \text{Integer}\left[-\frac{2v}{c \cdot \Delta f_{min}} f_0\right] \text{ and } v = m_v \frac{2}{c \cdot \Delta f_{min}} f_0 + \Delta v$$

$$\text{and } m_R = \text{Integer}\left[-\frac{2R}{c \cdot \Delta f_{min}} S_2 T\right]$$

where $m_v$ and $m_R$ represent frequency bin numbers for a speed v and a distance R of $f_{d2}$ and $N_1$ represents the frequency bin number Of $f_{d1}$. According to equation (18), improvement in accuracy by the Vernier effect can be judged.

According to the present embodiment, it is possible to achieve a radar which can reduce uncertainty in target identification and improve the accuracy of detection. In other words, the present embodiment can achieve a vehicle-mounted millimeter radar which can obtain a degree of redundancy in equations required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

According to the present embodiment, it is possible to detect a static object (a target with a relative speed 0). It also enables separate detection of static objects and separate detection of objects having a relative speed of 0. The separate detection is not satisfactorily performed by the two-frequency CW technique. Further, the present embodiment can reduce the possibility of erroneous detection and a long two measurement time that occur in the FMCW technique, and remove target uncertainty faster than the conventional technique, thereby achieving detection with higher accuracy.

Moreover, it is possible to reduce a modulation frequency bandwidth required for a radio frequency oscillator. Thus it is possible to reduce phase noise, obtain higher accuracy of detection with a simple and inexpensive radio-frequency circuit configuration, and reduce the possibility of interference from other radars.

Second Embodiment

In the first embodiment, a transmitted signal alternately stays on the two frequency sweep straight lines. A transmitted signal does not always have to stay on a straight line and may be periodically located alternately along positions substantially corresponding to two frequency sweep straight lines.

Figure 9:
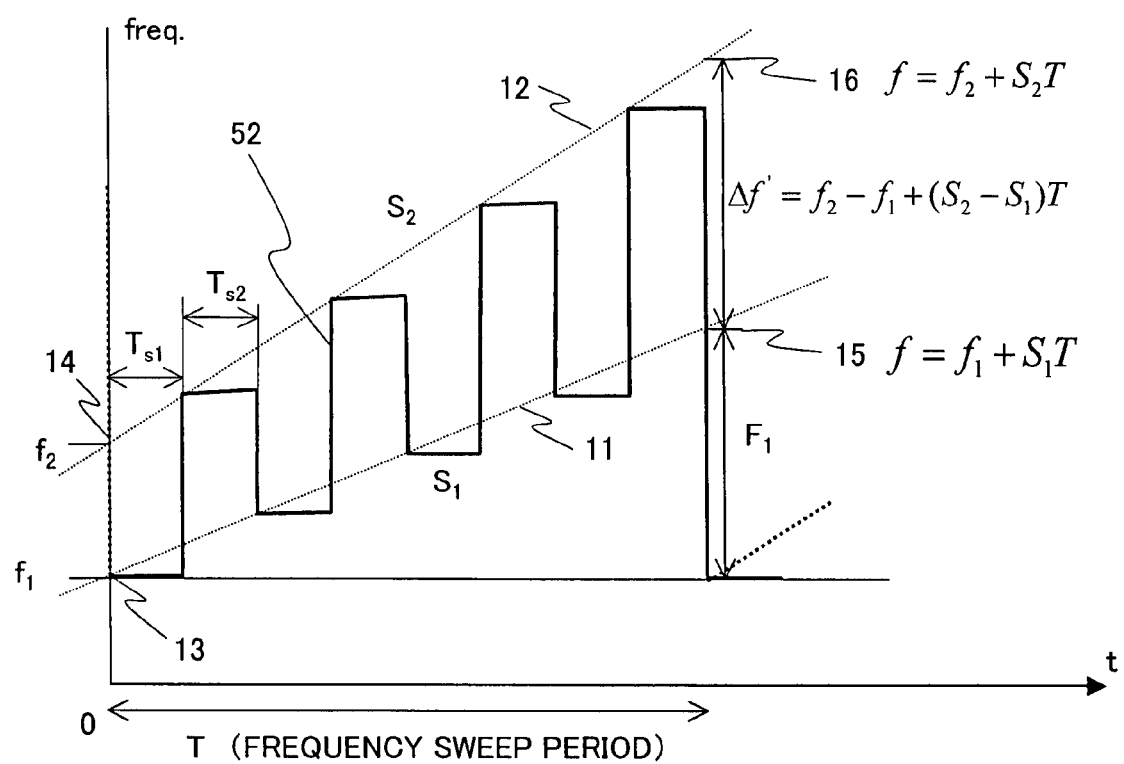
FIG. 9 shows a frequency modulation waveform of a transmitted signal of a radio frequency sensor according to a second embodiment of the present invention.

FIG. 9 shows a second embodiment of the frequency modulation pattern of a transmitted signal according to the present invention. As in FIG. 2, FIG. 9 illustrates the frequency modulation waveform of the transmitted signal as a time function.

In this example, the frequency of the transmitted signal is alternately fixed at predetermined fixed values (e.g., the value of the starting point or an intermediate value) on a frequency sweep straight line 11 extended from a first initial value $f_1$ with a slope $S_1$ relative to the time axis and a frequency sweep straight line 12 extended from a second initial value $f_2$ with a second slope $S_2$, which is different from the slope $S_1$, relative to the time axis. For example, during a first time $T_{s1}$, the frequency of the transmitted signal is fixed at the value of the starting point on the first frequency sweep straight line 11 (=first frequency initial value 13) and during a second time $T_{s2}$, the frequency of the transmitted signal is fixed at the value of the starting point on the second frequency sweep straight line 12. In this way, the frequency of the transmitted signal changes like steps.

When the modulation waveform (FIG. 2) in the first embodiment is subjected to digital sampling as shown in FIG. 3, an output signal obtained by each sampling operation has a value $\theta(i)$ expressed by equation (19) relative to a phase $\theta_1(t)$ of the output signal of the radio frequency mixer in equation (5):

$$\theta(i) \propto \int_{t_1} \theta_1(t) p_1(t) dt = \int_{t_1} \theta_1(t) dt \approx \int_{t_1} \theta_1(t_0) \cdot dt = \theta_1(t_0) \cdot t_1 \quad (19)$$

In other words, the output signal value is the integral of $\theta_1(t)$ during a sampling time $t_1$. When the phase $\theta_1(t)$ of the output signal changes quite gently as compared with $t_1$, the output signal value can be approximated by the integral of an instantaneous value $\theta_1(t_0)$ of $\theta_1(t)$. When sweeping is performed while alternately switching the frequency sweep straight line 11 with the slope $S_1$ and the frequency sweep straight line 12 with the slope $S_2$, the same calculations as equations (1) to (15) are performed in stepped modulation performed as shown in FIG. 9. The stepped modulation is performed such that the frequency remains constant in times $T_{s1}$ and $T_{s2}$ during which the signal stays on the sweep straight lines. In this case, it can be proved that the result of equation (19) is completely equal to that of the modulation waveform of FIG. 2 in the range of an approximate error.

According to the present embodiment, it is possible to achieve a radar which can reduce uncertainty in target identification and improve the accuracy of detection. In other words, the present embodiment can achieve a vehicle-mounted millimeter radar which can obtain a degree of redundancy in an equation required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

Particularly with the frequency modulation pattern of FIG. 9, a driving waveform for modulating a transmitted signal can be easily outputted and used directly from a digital circuit, thereby simplifying a system with higher accuracy.

[Modification]

FIGS. 2 and 9 show the frequency sweep straight lines having the slopes $S_1$ and $S_2 > 0$ as a frequency modulation pattern of a transmitted signal. $S_2 > 0$ and $S_1 < 0$ may be combined or $S_1$ and $S_2 < 0$ may be given. Further, one of $S_1$ and $S_2$ may be 0. In any of these cases, the foregoing discussion and equations hold true.

Third Embodiment

Figure 10:
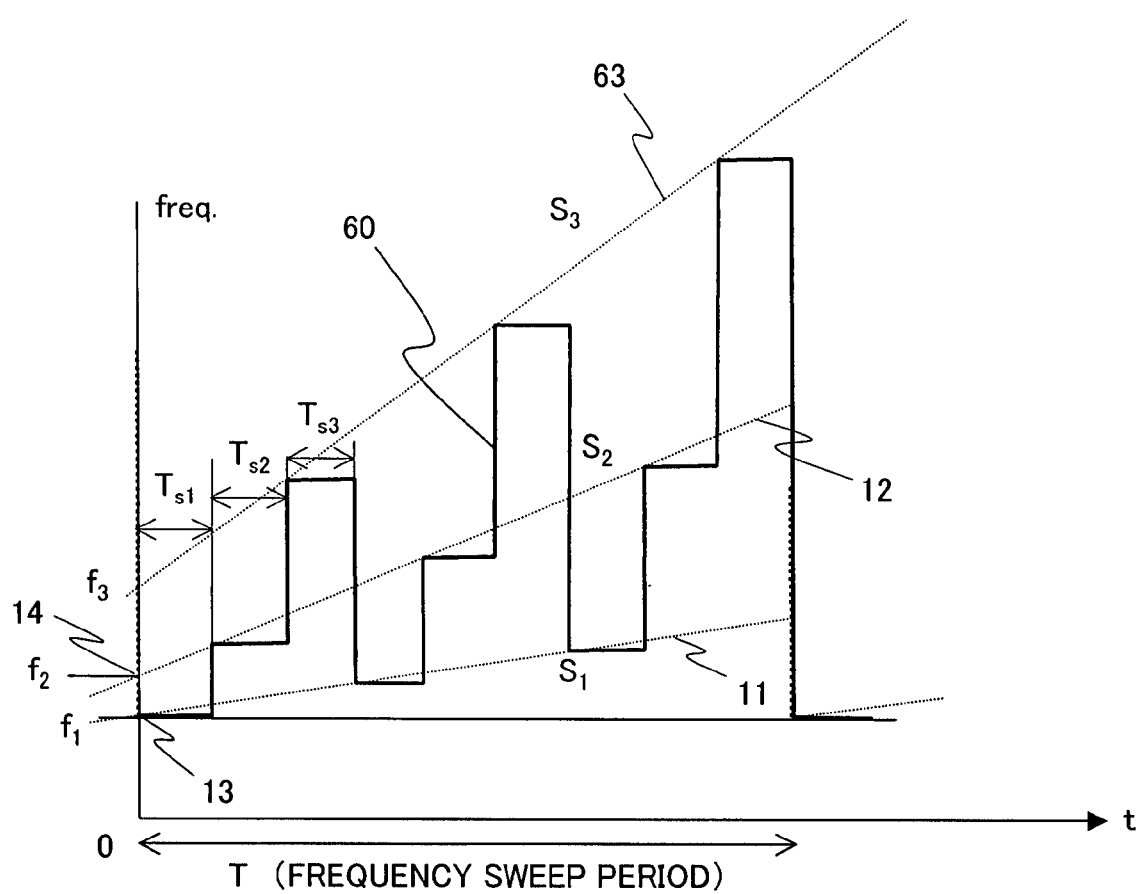
FIG. 10 shows a frequency modulation waveform of a transmitted signal of a radio frequency sensor according to a third embodiment of the present invention.

FIG. 10 shows a third embodiment of the frequency modulation pattern of a transmitted signal according to the present invention. In this frequency modulation pattern, a frequency sweep straight line 63 with a third slope $S_3$ is provided in addition to two frequency sweep straight lines 11 and 12 having different slopes. Sweeping is performed while switching the frequency sweep straight lines, so that three frequency equations and two phase equations can be obtained for a target, five independent equations can be provided for two unknowns (v,R) of the target with three degrees of redundancy. The increased degrees of redundancy can improve the accuracy of detection that is described in the first embodiment and can further enhance the effect of removing or reducing the possibility of erroneous detection and the possibility of undetected targets, thereby improving the performance of a radio frequency sensor.

Figure 11:
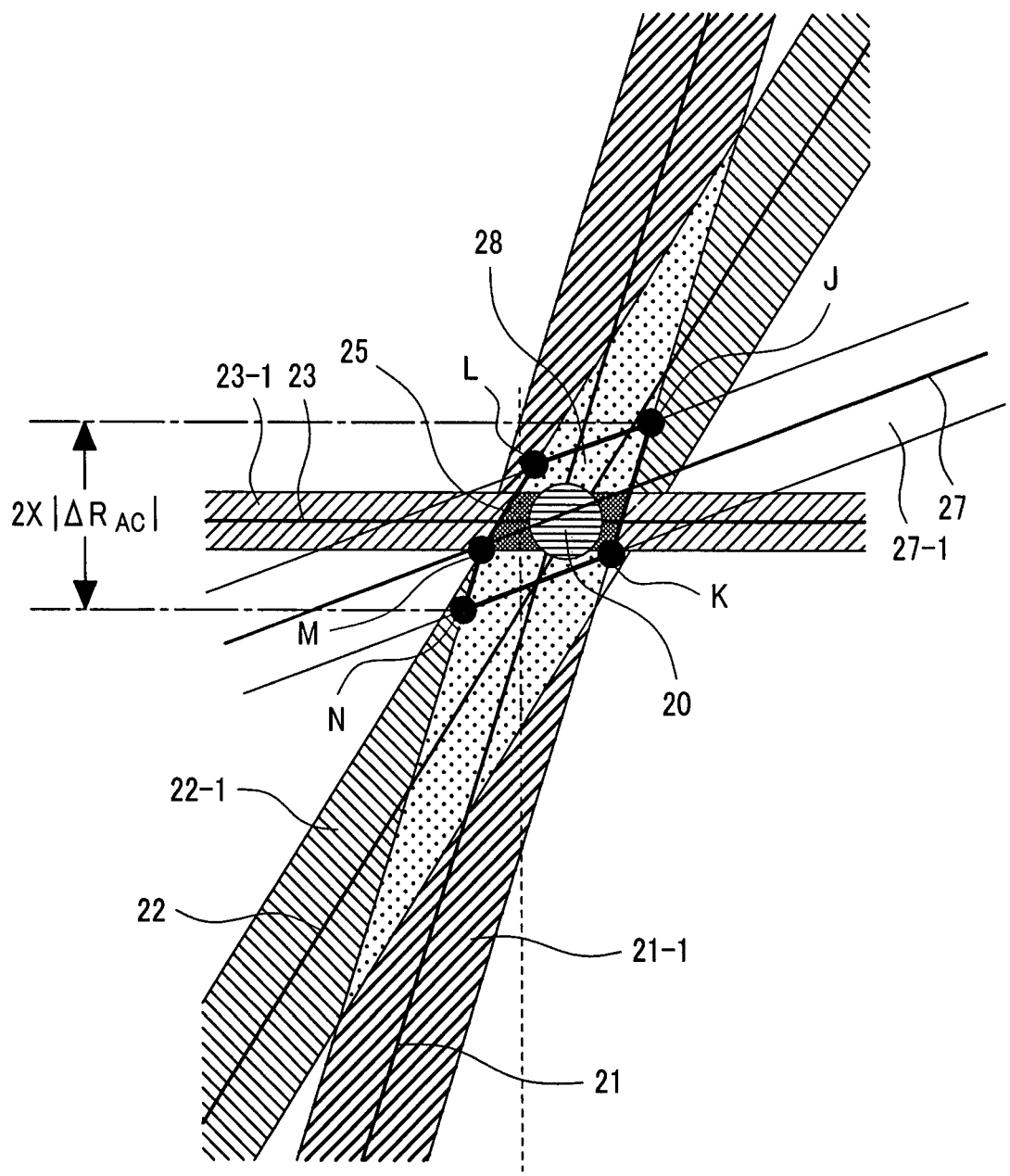
FIG. 11 is an explanatory drawing showing the effect of the third embodiment of the present invention.

A speed v and a distance R of a target 20 are determined as an intersection point of straight lines 21, 22 and 27. An uncertainty zone 25 of a solution for (v,R) determined by the uncertainty is given as a rectangular zone 28 surrounded by black dots J, K, N, M and L in FIG. 11. A length $\Delta R_{AC}$ of distance uncertainty is a shared part of a length of distance uncertainty determined by two equations (15). When comparing FIG. 11 with the example of FIG. 4, it is found that the uncertainty zone can be considerably reduced.

In the present embodiment, N sweep straight lines having different slopes are provided (N is 3). By increasing N, more degrees of redundancy can be easily obtained.

According to the present embodiment, it is possible to achieve a radar which can reduce uncertainty in target identification and improve the accuracy of detection. In other words, the present embodiment can achieve a vehicle-mounted millimeter radar which can obtain a degree of redundancy in an equation required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

In the first to third embodiments, the speed and distance of a target can be detected in a period corresponding to at least one sweep period T of a transmitted signal. It is thus possible to prevent accuracy from being reduced by a movement and so on of a target during a measurement time, achieving high accuracy of detection.

Fourth Embodiment

The frequency modulation pattern of a transmitted signal may be repeated for sweep times 2T or longer. In other words, the frequency modulation pattern may be a composite frequency modulation pattern in which the frequency of a transmitted signal periodically repeats, in respective M sweep times T, M unit frequency modulation patterns (M≧2) different among the respective sweep times T. The unit frequency modulation patterns may start from different initial values $f_{(1 \ to \ n)}$ at time t=0 in the respective sweep times T and the frequency of a transmitted signal may stay, for predetermined times $T_{s(1 \ to \ n)}$, on positions corresponding to N frequency sweep straight lines extended from the initial values with different slopes $S_{(1 \ to \ n)}$ relative to the time axis.

Figure 12:
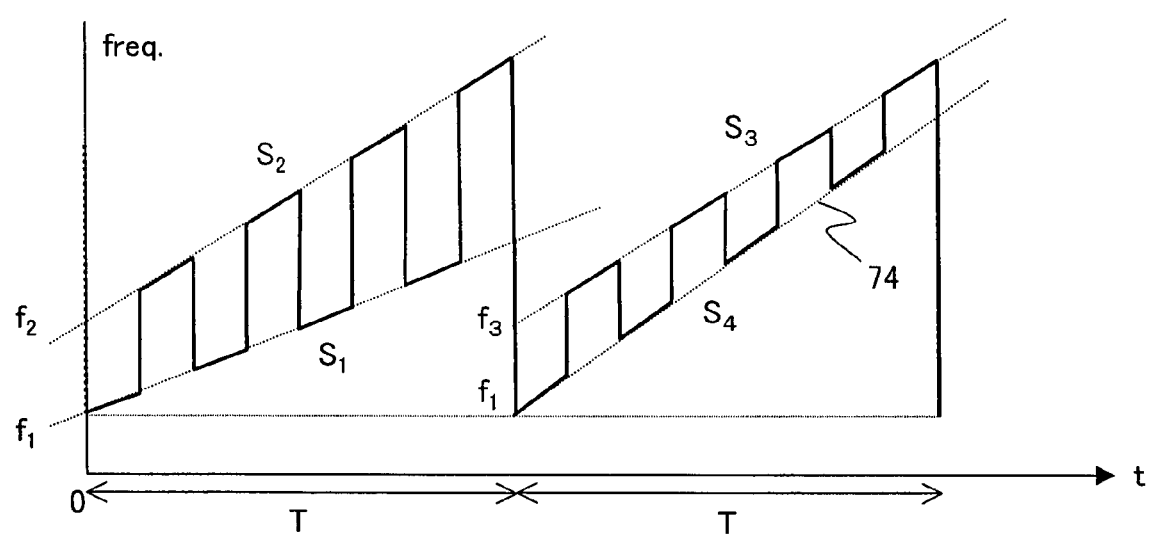
FIG. 12 shows a frequency modulation waveform of a transmitted signal of a radio frequency sensor according to a fourth embodiment of the present invention.

FIG. 12 shows an example of the composite frequency modulation pattern as a fourth embodiment. In the first sweep period T of a transmitted signal, sweeping is performed with slopes $S_1$ and $S_2$ and a frequency difference of $(f_2-f_1)$ as in the first embodiment. In the subsequent sweep period T, sweeping is performed with slopes $S_3$ and $S_4$ and a frequency difference of $(f_3-f_1)$. The transmitted signal is modulated with a frequency modulation pattern having the two sweep periods 2T serving as a unit. In each period T, targets can be separately detected as in the first embodiment. At the same time, by combining two sets of sweep data, four independent frequency equations and two phase equations are obtained, thereby increasing degrees of redundancy as in the third embodiment.

According to the present embodiment, two sweep periods (=2T) are necessary and thus the target detection rate slightly decreases. However, the increased degrees of redundancy can further enhance the effect of the first embodiment which increases the accuracy of detection and removes or reduces the possibility of erroneous detection and the possibility of undetected targets, thereby improving the performance of a radio frequency sensor.

Fifth Embodiment

Figure 13:
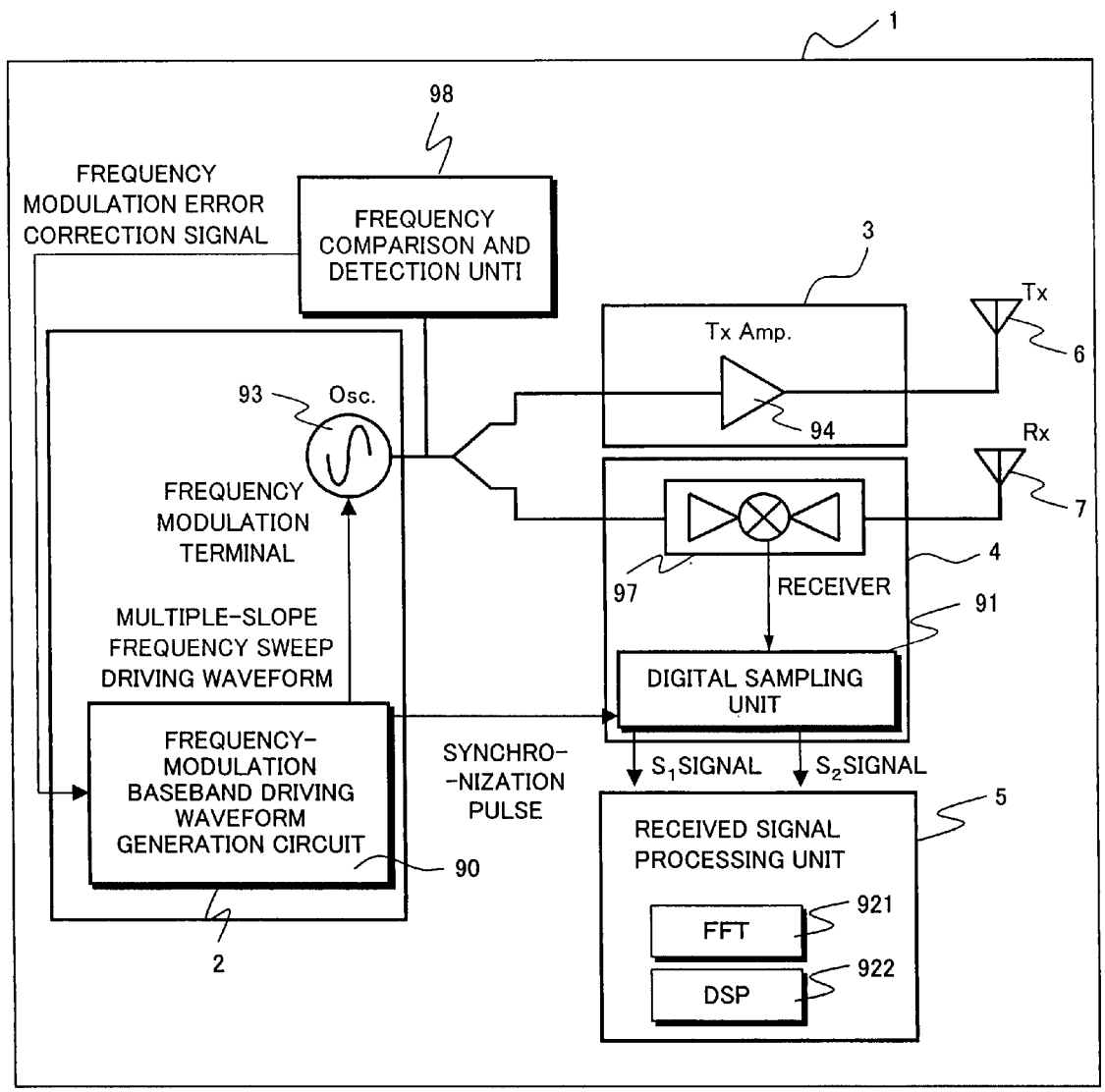
FIG. 13 is a functional block diagram showing a radio frequency sensor according to a fifth embodiment of the present invention.

FIG. 13 is a functional block diagram showing a more specific structural example of a radio frequency sensor according to a fifth embodiment of the present invention. Reference numeral 90 denotes a frequency-modulation baseband driving waveform generation circuit, reference numeral 91 denotes a digital sampling unit, reference numeral 93 denotes an oscillator, reference numeral 94 denotes a transmission power amplifier, reference numeral 97 denotes a receiver, and reference numeral 98 denotes a frequency comparison and detection unit.

The frequency of a radio frequency signal generated by the oscillator 93 can be modulated by a voltage applied to a frequency modulation terminal. The frequency-modulation baseband driving waveform generation circuit 90 generates driving waveforms for generating modulation along plural frequency sweep straight lines having different slopes as shown in FIGS. 2, 9, 10 and 12 according to the present invention, and the waveforms are applied to the frequency modulation terminal of the oscillator 93. In this case, a frequency-modulation baseband driving waveform can be generated by plural methods, for example, first and second methods described below:

In the first method, time-series data on the voltage values of frequency modulation patterns along plural ramp frequencies (S1, S2, -) is described by a program or is stored in memory and is outputted through a DA converter. This method makes it possible to easily rewrite a driving waveform by software and is effective when a modulation waveform is to be changed according to a detection environment.

In the second method, sawtooth wave generating analog circuits for sweeping with multiple slopes are prepared. A driving waveform is generated by sequentially switching outputs from the plural generation circuits.

Figure 14:
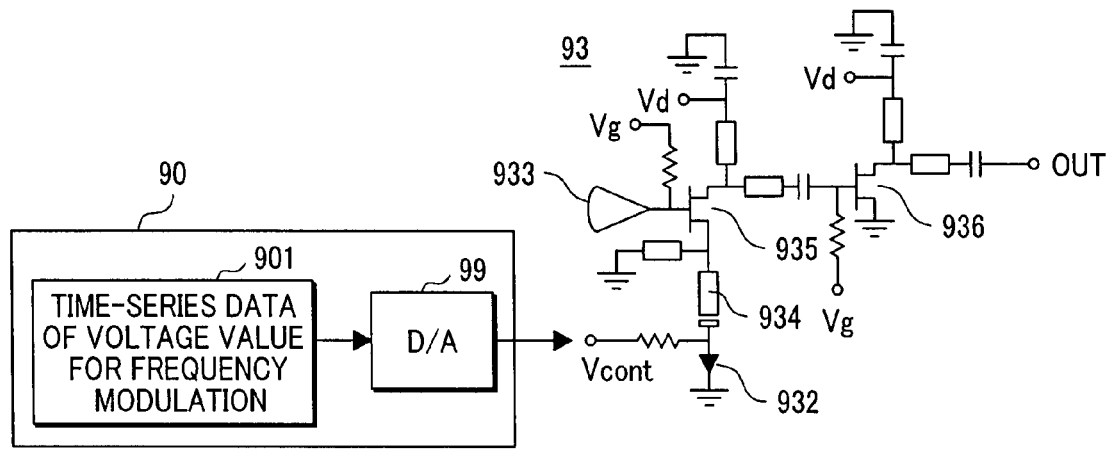
FIG. 14 shows a structural example of a frequency-modulation baseband driving waveform generation circuit and an oscillator according to the fifth embodiment of the present invention.

FIG. 14 shows a structural example of the oscillator 93 according to the first method. The voltage control oscillator 93 is a circuit for generating a superhigh frequency signal of a millimeter wave band and so on. In a high electron mobility transistor (HEMT) 935 for oscillation, a negative-resistance frequency generated by a radial stub 933 is adjusted. A varactor diode 932 for adjusting an oscillation frequency is connected to the end of an open-stub resonator 934. When a control voltage Vcont corresponding to time-series data of voltage values for frequency modulation is applied to the frequency modulation terminal of the varactor diode 932, the voltage values being supplied from the frequency-modulation baseband driving waveform generation circuit 90, the oscillation frequency of the HEMT 935 for oscillation is sequentially switched to multiple frequencies. A transmitted signal generated by the HEMT 935 for oscillation is amplified by an HEMT 936 for amplification and is output from an output terminal OUT. Reference character Vd denotes the power supplies of the HEMTs 935 and 936.

Figure 15:
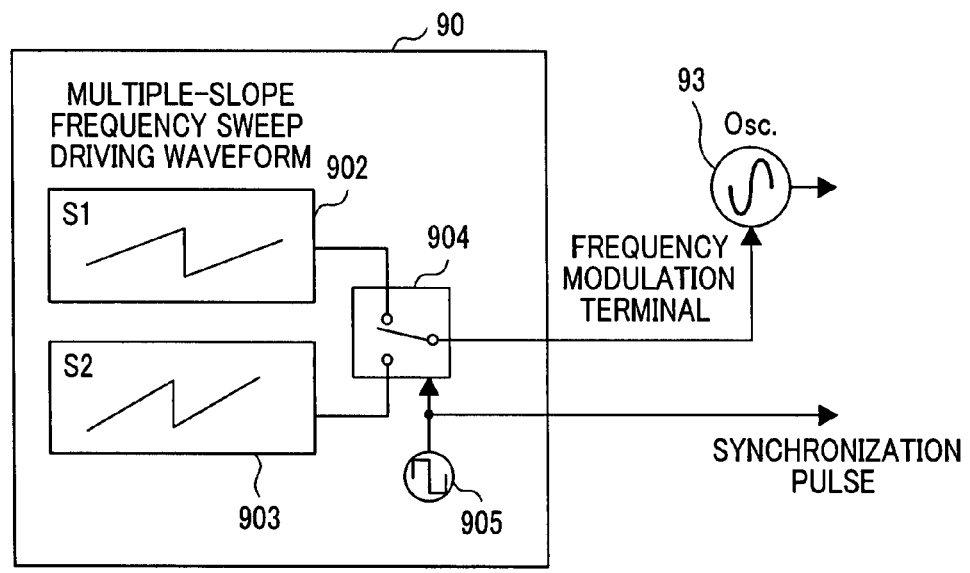
FIG. 15 shows another structural example of the frequency-modulation baseband driving waveform generation circuit according to the fifth embodiment of the present invention.

Referring to FIG. 15, the following will describe the driving waveform generating function of the baseband driving waveform generation circuit 90 and a structural example of the oscillator 93 according to the second method. The baseband driving waveform generation circuit 90 has, for example, plural sawtooth wave generation analog circuits 902, 903 and - to generate sawtooth waves which are not in parallel and sweep with slopes corresponding to multiple ramp frequencies (S1, S2, -), and the baseband driving waveform generation circuit 90 applies these sawtooth waves to the frequency modulation terminal of the oscillator 93. In this case, a switch 904 is connected between the sawtooth wave generation analog circuits and the input side of the oscillator 93. Outputs from the plural generation circuits are sequentially switched in the respective predetermined times $T_{s1}$, $T_{s2}$, and - by a synchronizing pulse synchronized with a switching signal 905, so that driving waveforms can be generated.

Returning to FIG. 13, the radio frequency signal modulated with the driving waveform and outputted from the oscillator 93 is amplified by the transmission power amplifier 94, is radiated from a transmission antenna 6, is distributed to the reception side, and is used as a local signal inputted to the receiver 97. The transmitted signal from the transmission antenna 6 is reflected and returned from a target, is received by a reception antenna 7, and is mixed with the local signal from the oscillator 93 by the receiver 97, so that an output signal corresponding to a phase difference between the signals is obtained.

At this moment, a signal reflected from a target at a short distance reaches a radar after a short delay, whereas a signal reflected from a distant target has a long propagation distance and thus reaches after a long delay. These signals are inputted to the receiver 97. A low frequency signal generated by mixing of the local signal and the received signal in the receiver 97 is outputted to the analog circuits. The low frequency signal includes a frequency depending upon the speed and distance of a target and includes phase information.

An AD converter converts an inputted signal into a digital signal and outputs the digital signal. In other words, by means of a synchronizing pulse outputted from the driving waveform generation circuit 90 in synchronization with frequency modulation, the output signal from the receiver 97 is sampled in the digital sampling unit 91 so as to be shifted in each time $T_s$ shown in FIG. 3, the signal is divided into signal components corresponding to frequency sweep slopes, and the signal components are transmitted to a received signal processing unit 5.

The received signal processing unit 5 includes a fast Fourier transform (FFT) processing unit 921 and a digital signal processor (DSP) 922. In the received signal processing unit 5, digital signal processing is performed on the signal components corresponding to the frequency sweep slopes, and by using analytical methods including equations (11) and (12) described in the first embodiment, information about a target is extracted and erroneous detection and signal interference and so on are detected and judged.

The radio frequency sensor includes the frequency comparison and detection unit 98 for monitoring the frequency of the frequency-modulated radio frequency signal which is transmitted from the oscillator 93, comparing the monitored frequency with a reference value, that is, an ideal modulation frequency waveform, and outputting an error correction signal. Thus the error correction signal from the detection unit 98 can be fed back to the driving waveform generation circuit 90, achieving more accurate detection.

According to the present embodiment, it is possible to achieve a radar which can reduce uncertainty in target identification and improve the accuracy of detection. In other words, according to the present embodiment, it is possible to achieve a vehicle-mounted millimeter radar which can obtain a degree of redundancy in an equation required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

Moreover, since the modulation frequency bandwidth required for a radio frequency oscillator can be reduced, it is possible to reduce phase noise, obtain higher accuracy of detection with a simple and inexpensive radio-frequency circuit configuration, and reduce the possibility of interference from other radars.

Sixth Embodiment

Figure 16:
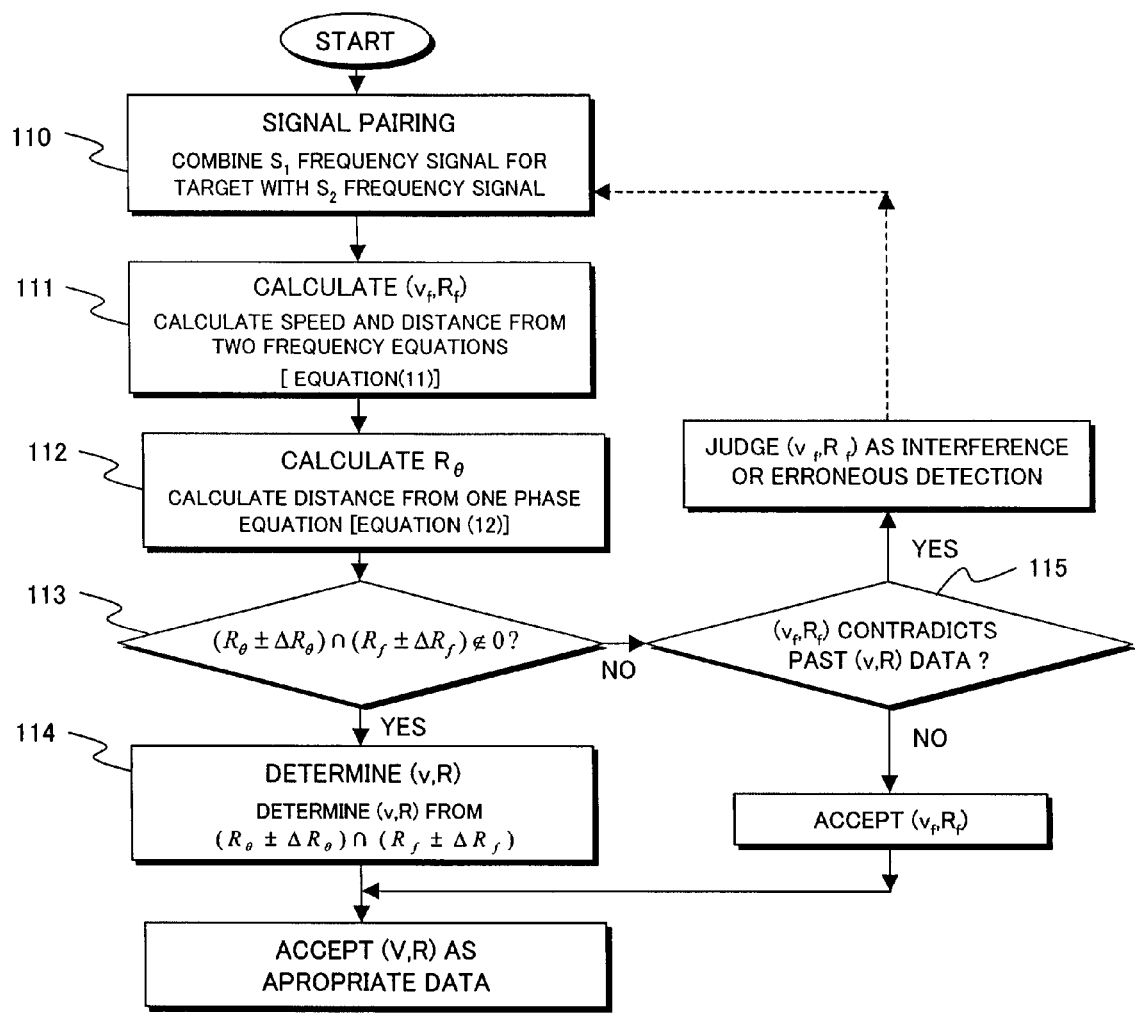
FIG. 16 shows an algorithm for extracting target information and judging interference and erroneous detection according to the fifth embodiment of the present invention.

As a sixth embodiment of the present invention, FIG. 16 shows an algorithm for extracting target information and judging interference and erroneous detection. This algorithm is effective when used as a method for processing, in the received signal processing unit 5, a received signal from a target through the functional block shown in FIG. 13 by means of, for example, the modulation frequency waveform shown in FIG. 2 and so on. In this case, the received signal processing unit 5 has the functions of a signal pairing unit 110, a target ($v_f$, $R_f$) calculation unit 111, a $R_\theta$ calculation unit 112, a signal pairing judgment unit 113, a target (v,R) determination unit 114, and a data comparison and judgment unit 115.

Signal components ($S_1$ signal and $S_2$ signal) corresponding to two different frequency sweep slopes obtained by sampling are first transformed from time domain signals to frequency domain signals by fast Fourier transform (FFT). In the signal pairing unit 110, out of plural signal peaks corresponding in a frequency domain to multiple targets, a peak in the $S_1$ signal and a peak in the $S_2$ signal are selected as a pair from a target (see FIG. 3).

In the ($v_f, R_f$) calculation unit 111, a speed $v_f$ and a distance $R_f$ of the target and the range of an uncertainty zone 24 are calculated from the frequencies of the paired two signals according to frequency equation (11) (see FIGS. 4 and 5).

In the $R_\theta$ calculation unit 112, a distance $R_\theta$ of the target is calculated from a phase difference between the two signals according to phase equation (12). In the signal pairing judgment unit 113, it is judged whether or not an intersection zone of the uncertainty zone 24 of ($v_f, R_f$) and the uncertainty zone of $R_\theta$ is present. When the intersection zone is present, the (v,R) determination unit 114 determines the distance and the speed of a target 20 from the intersection zone, and the result is used as appropriate data.

When the intersection zone is not present, the two selected signals may be erroneously combined or considerable interference from other targets may occur. Thus the data comparison and judgment unit 115 decides the presence or absence of erroneous combination or interference to verify the appropriateness of data.

According to the present embodiment, it is possible to achieve a radar which can reduce uncertainty in target identification and improve the accuracy of detection. In other words, the present embodiment can achieve a vehicle-mounted millimeter radar which can obtain a degree of redundancy in an equation required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

Seventh Embodiment

Figure 17:
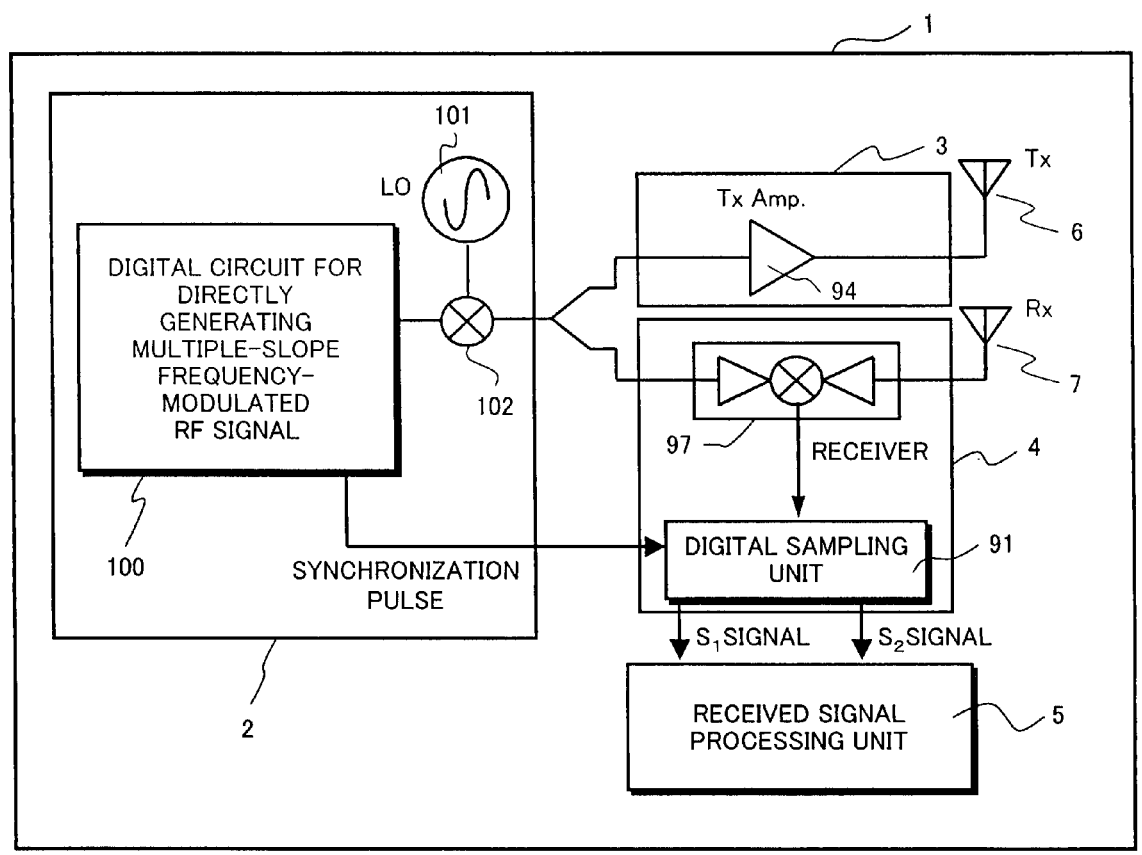
FIG. 17 is a functional block diagram showing a radio frequency sensor according to a sixth embodiment of the present invention.
Figure 18:
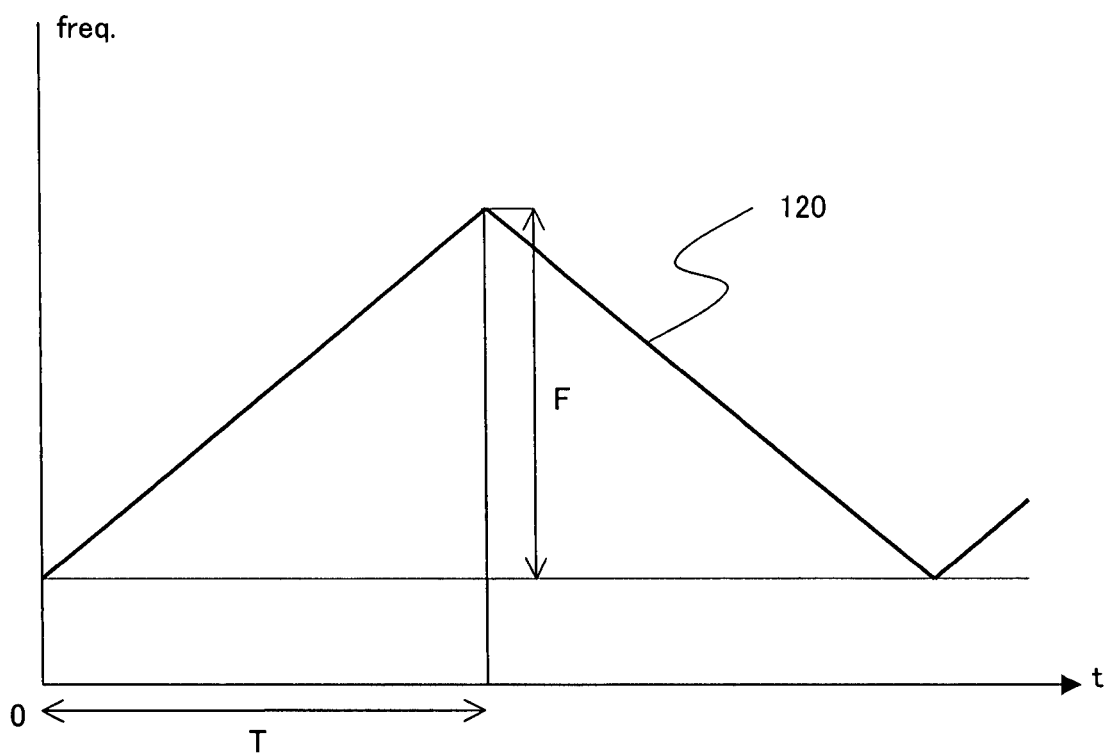
FIG. 18 shows a modulation waveform of a transmit frequency according to an FMCW modulation technique which is an example of the prior art.
Figure 19:
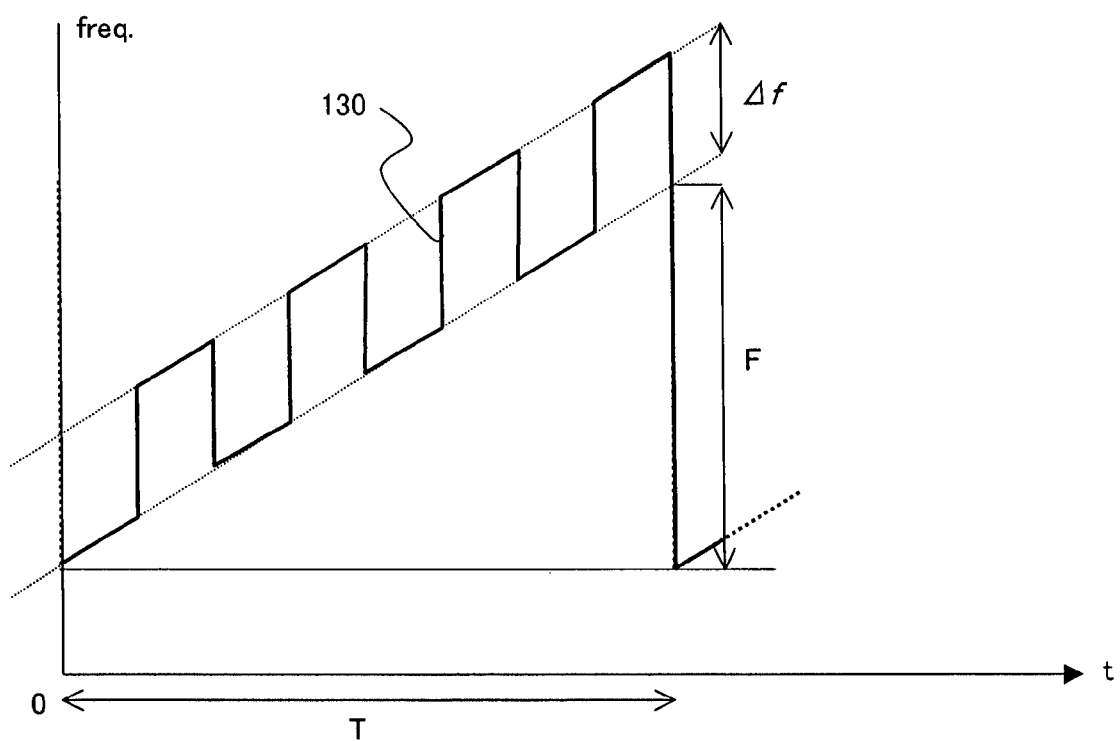
FIG. 19 shows a modulation waveform of a transmit frequency in U.S. Pat. No. 5,963,163 which is an example of the prior art.

FIG. 17 shows another functional block of a radio frequency sensor according to a seventh embodiment of the present invention. Reference numeral 100 denotes a digital circuit unit for directly generating multiple-slope frequency modulation radio frequency, reference numeral 101 denotes a local oscillator, and reference numeral 102 denotes a radio frequency mixer. The configurations and functions of a digital sampling unit 91 and a received signal processing unit 5 are similar to, for example, those of FIGS. 13 and 16. In this configuration, the digital circuit unit 100 directly generates a first radio frequency modulated along multiple frequency sweep straight lines having different slopes according to the present invention. To be specific, for example, the first radio frequency is generated by a direct digital synthesis (DDS) synthesizer technique. In DDS, an output frequency having a predetermined frequency modulation pattern is generated as the first radio frequency according to a given frequency set value. The generated first radio frequency is mixed with the signal of the local oscillator 101 in the radio frequency mixer 102 and is transformed to a second radio frequency signal having a desired frequency. Further, the digital circuit unit 100 outputs a synchronizing pulse in synchronization with transmit frequency modulation and the pulse is transmitted to the digital sampling unit 91 of a received signal.

According to the present embodiment, it is possible to achieve a radar which can reduce uncertainty in target identification and improve the accuracy of detection. In other words, the present embodiment can achieve a vehicle-mounted millimeter radar which can obtain a degree of redundancy in an equation required for identifying a target to be detected from signals obtained in a measurement time of the radar, can improve, by using the degree of redundancy, the accuracy of detection of a target and detect erroneous detection of a target and erroneous measurements caused by signal interference, and simultaneously requires high-speed detection, a high resolution, high accuracy, and high reliability.

What is claimed is:

1. A radar, comprising:
   a radio frequency signal generation unit;
   a transmission unit;
   a reception unit; and
   a signal processing unit,
   wherein the radio frequency signal generation unit is configured to generate a composite frequency modulation pattern for periodically repeating every sweep period T relative to a time axis,
   wherein the composite frequency modulation pattern comprises different M ($M \geq 2$) sub-frequency modulation patterns in respective time $T_{S(1\ to\ n)}$,
   wherein each of said M sub-frequency modulation patterns is composed of different N ($N \geq 2$) frequency sections,
   wherein a start point of each of said N frequency sections is on one of N frequency sweep straight lines, each having a slope $S_n$ (n=1 to N),
   wherein said N frequency sweep straight lines are extended from different initial values $f_{(1\ to\ n)}$ at time t=0 in each of the frequency sweep periods T with different slopes $S_{(1\ to\ n)}$ relative to the time axis where $S_{(1\ to\ n)} \neq 0$,
   wherein a start point of a kth frequency section (k=1 to N) in each sub-frequency modulation pattern is on a sweep straight line having a slope $S_k$,
   wherein said N frequency sweep straight lines do not intersect one another within any of the frequency sweep periods T,
   wherein the transmitted signal modulated by the frequency modulation pattern in each of the sweep times T is transmitted from the transmission unit,
   wherein the reception unit receives a signal scattered on a target to be detected, and
   wherein the signal processing unit detects a distance and a speed of the target.

2. The radar according to claim 1, wherein the frequency modulation pattern is set to have a relationship of $\Delta S \cdot T = \alpha \cdot c / \Delta R_{AC}$ where the target to be detected has a length of distance uncertainty of $2 \cdot \Delta R_{AC}$, the signal processing unit has a frequency resolution of $\alpha/T$, $\Delta S$ represents a difference in slope between a first frequency sweep straight line and a second frequency sweep straight line of the transmitted signal, and c represents the speed of light,
where $\alpha$ is determined by phase noise of a transmitted signal and a noise figure of a receiver, and $\Delta R_{AC}$ is a length of distance uncertainty.

3. The radar according to claim 1, wherein the frequency modulation pattern is set such that at least one of frequency differences $\Delta f_{xn}$ among the initial values $f_1$ to $f_n$ of n sweep frequencies has a relationship of $\Delta f_{xn} c/(4 R_{max})$ where $R_{max}$ represents a maximum distance of the target intended to detect without uncertainty and c represents the speed of light.

4. The radar according to claim 1, wherein the signal processing unit has a function of analyzing solutions of equations by means of a degree of redundancy of (2N−1) equations obtained from N frequencies and values of (N−1) phase differences between the N received signal components, the N frequencies being extracted from N (N≧2) received signal components corresponding to N sweep slopes of the transmitted signal and being expressed as functions of two unknowns (speed, distance) for identifying the target, and a function of judging erroneous detection of the signal or presence of interference according to a result of the analysis.

5. The radar according to claim 4, wherein the signal processing unit has a function of estimating a distance from the detected target as a function of a phase difference ($\Delta\phi$) between received signals (Rn(t)) corresponding to the frequency sweep straight lines.

6. The radar according to claim 1,
wherein the signal processing unit determines a speed v and a distance R of the target to be detected, as an intersection point of two frequency straight lines $f'_{d1}$ and $f'_{d2}$ of a first equation representing a time variation of a phase of an output signal, the time variation being extracted from received signal components and obtained according to the respective sweep slopes, and
wherein the first equation is $$f_{d1}' = f_{d1} - S_1\tau$$

$$f_{d2}' = f_{d2} - S_2\tau$$

where $\tau = 2R/c$ and c represents the speed of light.

7. The radar according to claim 6,
wherein the signal processing unit determines the speed v and the distance R of the target to be detected, based on the first equation and a second equation expressing a phase difference $\Delta\theta$ of the output signals being obtained according to respective sweep slopes,
wherein the phase difference $\Delta\phi$ is not varying with time and is obtained according to the first equation and the respective sweep slopes, and
wherein the second equation is $$\Delta\theta = -2\pi\tau\left[(\Delta f + S_2 T_s) - \frac{S_2 - S_1}{2}\tau\right] = -2\pi\tau\left[(\Delta f + S_2 T_s) - \frac{\Delta S}{2}\tau\right]$$

where $\Delta f = f_2 - f_1$ and $\Delta S = S_2 - S_1$ and
$\tau = 2R/c$ and c represents the speed of light.

8. The radar according to claim 1, wherein the reception unit has a function of extracting, from the signal scattered and returned from the target, signal components corresponding to the sweep slopes by digital sampling in synchronization with the transmitted modulation signal, and
wherein the signal processing unit has a function of converting the extracted signal components to digital signal information and performing digital signal processing and a function of calculating a speed and distance information of the target based on the extracted signal components and a frequency and a phase of a combined component of the signal components.

9. The radar according to claim 1, wherein the signal processing unit has a function of performing digital signal processing on the received signal for each time of sweeping having the plurality of different slopes $S_1, S_2, \ldots$ and $S_n$, the received signal being obtained from frequency sweep straight line modulation having the plurality of different slopes, and
wherein a function of a Vernier function of obtaining, by calculation, a distance resolution smaller than any one of minimum distance resolutions ($c/[2S_1T]$, $c/[2S_2T]$, where c represents the speed of light) determined by the respective sweeps by means of a mutual relationship among digital frequency values of the received signal, the digital frequency values being obtained from the same target in the respective sweeps.

10. The radar according to claim 1, wherein the radar is a radio frequency sensor using a radio frequency as a wave medium, and
wherein the signal generation unit has a function of directly generating a frequency-modulated first radio frequency signal by digital signal processing and generating a second frequency-modulated radio-frequency transmitted signal by mixing the first radio-frequency signal with a signal from a radio frequency oscillator oscillating at a constant frequency.

11. The radar according to claim 1, wherein the radar is a radio frequency sensor using a radio frequency as a wave medium, and
wherein the signal generation unit has a function of generating the frequency-modulated radio-frequency transmitted signal by directly applying the signal for frequency modulation to a first radio frequency oscillator.

12. The radar according to claim 1, wherein the radar is a radio frequency sensor using a radio frequency as a wave medium, and has a function of monitoring a frequency of the frequency-modulated radio-frequency transmitted signal, comparing the monitored frequency with a reference value, and correcting a modulation error according to the comparison.

13. A radar detection method in which a transmitted signal is transmitted from the radar according to claim 1,
the method comprising the steps of:
alternately transmitting, from the transmission unit, N discontinuous frequency modulation ramps having different slopes relative to a time axis and starting from initial values $f_{(1\ to\ n)}$ different from one another by a frequency offset ($\Delta f$) at time t=0 in each sweep time T, and
digitally sampling the signal to separate into N output signal components, each of which corresponds to one of the N straight lines of frequency sweeps, in synchronization with the transmitted signal, signal components from the received signal having been reflected and returned from the target, the signal components corresponding to the respective frequency modulation ramps, and detecting the distance and the speed of the target by analyzing the received signal.

14. The radar detection method according to claim 13, wherein the signal processing unit analyzes solutions of equations by means of a degree of redundancy of (2N−1) equations obtained from N frequencies and values of (N−1) phase differences among the N received signal components, the N frequencies being extracted from N (N≧2) received signal components corresponding to N sweep slopes of the transmitted signal and being expressed as functions of two unknowns (speed, distance) for identifying the target, and
wherein the signal processing unit judges erroneous detection of the signal or presence of interference according to a result of the analysis.

* * * * *